United States Patent
Nogami et al.

(10) Patent No.: US 8,355,371 B2
(45) Date of Patent: Jan. 15, 2013

(54) WIRELESS COMMUNICATION DEVICE AND WIRELESS COMMUNICATION SYSTEM

(75) Inventors: Toshizo Nogami, Chiba (JP); Takashi Onodera, Yotsukaido (JP)

(73) Assignee: Sharp Kabushiki Kaisha, Osaka (JP)

( * ) Notice: Subject to any disclaimer, the term of this patent is extended or adjusted under 35 U.S.C. 154(b) by 971 days.

(21) Appl. No.: 12/441,866

(22) PCT Filed: Sep. 19, 2007

(86) PCT No.: PCT/JP2007/068173
§ 371 (c)(1),
(2), (4) Date: Mar. 18, 2009

(87) PCT Pub. No.: WO2008/035706
PCT Pub. Date: Mar. 27, 2008

(65) Prior Publication Data
US 2009/0279497 A1   Nov. 12, 2009

(30) Foreign Application Priority Data
Sep. 20, 2006 (JP) .................................. 2006-254570

(51) Int. Cl.
*H04W 72/00* (2009.01)
(52) U.S. Cl. ........ 370/329; 370/341; 370/343; 370/431; 455/513; 455/515; 455/450
(58) Field of Classification Search .................. 370/319, 370/329, 464, 465, 431, 343, 535; 455/450, 455/454, 562, 464, 513, 515
See application file for complete search history.

(56) References Cited

U.S. PATENT DOCUMENTS

| | | | |
|---|---|---|---|
| 6,418,317 B1 * | 7/2002 | Cuffaro et al. | ............... 455/450 |
| 6,842,630 B2 * | 1/2005 | Periyalwar | ................ 455/562.1 |
| 7,363,573 B1 * | 4/2008 | Bataineh | ...................... 714/758 |
| 7,782,895 B2 * | 8/2010 | Pasanen et al. | ............... 370/465 |
| 2005/0085236 A1 | 4/2005 | Gerlach et al. | |
| 2005/0181799 A1 | 8/2005 | Laroia et al. | |
| 2006/0089102 A1 | 4/2006 | Nishio et al. | |

(Continued)

FOREIGN PATENT DOCUMENTS

JP   2001-148682 A   5/2001

(Continued)

OTHER PUBLICATIONS

"Comments on Frequency Scheduling and Joint Power and Rate Optimization for OFDM", 3GPP, TSG RAN WG1 Meeting #29, R-02-1321, Nov. 5-8, 2002.

*Primary Examiner* — Robert Wilson
*Assistant Examiner* — Mohamed Kamara
(74) *Attorney, Agent, or Firm* — Birch, Stewart, Kolasch & Birch, LLP

(57) ABSTRACT

A wireless communication device of the present invention receives a signal on a channel that another wireless communication device allocates to the wireless communication device from a plurality of channels. The wireless communication device includes: an update channel selector that selects a plurality of request channels that are candidates to be allocated to the wireless communication device from the channels, calculates a difference between a group of the request channels and a group of predetermined channels, and generates difference information indicative of the difference; and a multiplexer that multiplexes the difference information to a signal to be transmitted to the other wireless communication device.

15 Claims, 17 Drawing Sheets

U.S. PATENT DOCUMENTS

| | | |
|---|---|---|
| 2006/0133402 A1 | 6/2006 | Dottling et al. |
| 2006/0165188 A1 | 7/2006 | Wunder et al. |

FOREIGN PATENT DOCUMENTS

| | | |
|---|---|---|
| JP | 2004-147068 A | 5/2004 |
| JP | 2004-208234 A | 7/2004 |
| JP | 2004-282474 A | 10/2004 |
| JP | 2005-130491 A | 5/2005 |
| JP | 2006-517752 A | 7/2006 |
| JP | 2006-211651 A | 8/2006 |
| JP | 2006-524966 A | 11/2006 |

* cited by examiner

| CHANNEL NUMBER | CHANNEL-QUALITY MEASUREMENT RESULT |
|---|---|
| C1 | 6 |
| C2 | 9 |
| C3 | 10 |
| C4 | 6 |
| C5 | 3 |
| C6 | 8 |

| CHANNEL NUMBER | CHANNEL QUALITY INFORMATION |
|---|---|
| C1 | 7 |
| C2 | 9 |
| C3 | 10 |

FIG. 7

| DELETE CHANNEL NUMBER | ADDITIONAL CHANNEL NUMBER | CHANNEL QUALITY OF ADDITIONAL CHANNEL |
|---|---|---|
| C1 | C6 | 8 |

FIG. 8

| CHANNEL NUMBER | CHANNEL QUALITY INFORMATION |
|---|---|
| C2 | 9 |
| C3 | 10 |
| C6 | 8 |

| CHANNEL NUMBER | BUFFER NUMBER |
|---|---|
| C1 | B3 |
| C2 | B1 |
| C3 | B2 |

| BUFFER NUMBER OF DELETE CHANNEL | ADDITIONAL CHANNEL NUMBER | CHANNEL QUALITY OF ADDITIONAL CHANNEL |
|---|---|---|
| B3 | C6 | 8 |

FIG. 23

| DELETE CHANNEL NUMBER | ADDITIONAL CHANNEL NUMBER | AVERAGE CHANNEL QUALITY |
|---|---|---|
| C1 | C6 | 9 |

FIG. 24

| DELETE CHANNEL NUMBER | AVERAGE CHANNEL-QUALITY INFORMATION |
|---|---|
| C1 | 9 |
| ADDITIONAL CHANNEL NUMBER | 10 |
| C3 | 8 |

WIRELESS COMMUNICATION DEVICE AND WIRELESS COMMUNICATION SYSTEM

TECHNICAL FIELD

The present invention relates to a wireless communication device and a wireless communication system, and particularly to a wireless communication device and a wireless communication system for transmitting and receiving data over a channel allocated from multiple channels based on information indicated in reverse link.

This application is the National Phase of PCT/JP2007/068173 filed on Sep. 19, 2007, which claims priority under 35 U.S.C. 119(a) to Patent Application No. 2006-254570 filed in Japan on Sep. 20, 2006, all of which are hereby expressly incorporated by reference into the present application.

BACKGROUND ART

Currently, demand for data communication is increasing in a mobile communication system. Various technologies achieving the high frequency utilization efficiency have been proposed with the increase in data communication.

One of the technologies capable of enhancing the frequency utilization efficiency is OFDMA (Orthogonal Frequency Division Multiple Access) in which a modulation scheme for communication is OFDM (Orthogonal Frequency Division Multiplexing) and an access scheme is TDMA (Time Division Multiple Access) or FDMA (Frequency Division Multiple Access). OFDMA is a communication scheme achieving higher-speed data communication while a common radio interface is used in both an isolated cell and a cell area.

In HSDPA (High Speed Downlink Packet Access) of a W-CDMA (Wideband-Code Division Multiple Access) mobile communication system, a scheduling method for an OFDMA system has been proposed in which a communication terminal device indicates a CQI (Channel Quality Indicator) for every subcarrier indicative of a downlink channel condition to a base station device so that the base station device performs packet scheduling based on the CQI for every subcarrier indicated by each communication terminal device (see, for example, Non-patent Document 1).

Similarly, an invention is disclosed in which a communication terminal device evaluates each downlink channel condition (frequency characteristics) upon scheduling of transmission data in an OFDMA system using multiple subcarriers and indicates the channel condition that is quantized to a base station device using an uplink feedback channel so that the base station device determines subcarriers to be allocated to each communication terminal device based on the indicated information (see, for example, Patent Document 1).

As a channel-quality feedback method for an OFDMA system, a method has been proposed in which a receiver selects multiple subcarriers having high channel qualities and indicates information indicative of the subcarriers and an averaged value of the channel qualities of the subcarriers to a transmitter so that the amount of feedback information is reduced to prevent overhead in reverse link from a communication terminal device to a base station device (see, for example, Patent Document 2).

Additionally, another method for an OFDM system has been proposed in which a receiver specifies carriers having bad channel qualities and indicates frequency information concerning the specified carriers or the numbers of the specified carriers to a base station so that the carriers having the bad channel qualities are not used (see, for example, Patent Documents 3 and 4).

Patent Document 1: Japanese Unexamined Patent Application, Fast Publication No. 2005-130491
Patent Document 2: Japanese Unexamined Patent Application, Fast Publication No. 2004-208234
Patent Document 3: Japanese Unexamined Patent Application, Fast Publication No. 2001-148682
Patent Document 4: Japanese Unexamined Patent Application, Fast Publication No. 2004-147068
Non-patent Document 1: "Comments on frequency scheduling and joint power and rate optimization for OFDM", 3GPP, TSG RAN WG1 Meeting #29, R-02-1321, November, 2002

DISCLOSURE OF THE INVENTION

Problems to be Solved by the Invention

However, the amount of identification information (the number of bits) for identifying channels is large since the number of channels is very large in broadband communication. Thereby, there is a problem on heavy data communication traffic in reverse link (uplink) from a communication terminal device to a base station device if identification information concerning the channels and channel quality indicators of the respective channels are fed back from the communication terminal device to the base station device.

The present invention has been made in consideration of the above situations, and an object thereof is to provide a wireless communication device, a wireless communication system, and a wireless communication method for reducing the amount of information to be fed back in reverse link to prevent heavy communication traffic in the reverse link.

Means for Solving the Problems

To solve the problems, a wireless communication device of the present invention receives a signal using a channel allocated to the wireless communication device by another wireless communication device from a plurality of channels. The wireless communication device includes: an update channel selector that selects a plurality of request channels that are candidates to be allocated to the wireless communication device from the channels, calculates a difference between a group of the request channels and a group of predetermined channels, and generates difference information indicative of the difference; and a multiplexer that multiplexes the difference information to a signal to be transmitted to the other wireless communication device.

Accordingly, the wireless communication device of the present invention feeds back difference information indicative of the difference between the predetermined channels and the currently selected request channels to another wireless communication device through a reverse link. Therefore, the amount of information to be fed back can be reduced.

In the wireless communication device of the present invention, the update channel selector may select a plurality of request channels that are candidates to be allocated to the wireless communication device from the channels, calculate a difference between a group of the request channels currently selected and a group of request channels previously selected or channels allocated by the other wireless communication device, and generate difference information indicative of the difference.

Accordingly, the wireless communication device of the present invention feeds back difference information indicative of the difference between the previously selected request channels or the channels allocated by the other wireless communication device, and the currently selected request channels to the other wireless communication device through a reverse link. Therefore, the amount of information to be fed back can be reduced.

In the wireless communication device of the present invention, the difference information may include information concerning a channel to be deleted, and an identifier uniquely defined among the predetermined channels to be compared with the request channels when the difference is calculated may be used as the information concerning the channel to be deleted.

Accordingly, the wireless communication device of the present invention can reduce the amount of identification information concerning the channel to be deleted, the identification information being included in the difference information. Therefore, the amount of information to be fed back can be further reduced.

The wireless communication device of the present invention may further include a buffer identification demultiplexer that demultiplexes, from the signal received from the other wireless communication device, identifiers of buffer regions into which the other wireless communication device stores identifiers of the request channels, respectively. The update channel selector may use corresponding one of the identifiers demultiplexed by the buffer identification demultiplexer as information concerning a channel to be deleted which is included in the difference information.

The wireless communication device may further include a buffer identification demultiplexer that demultiplexes, from the signal received from the other wireless communication device, identifiers of buffer regions into which the other wireless communication device stores the channels allocated by the other wireless communication device, respectively. The update channel selector may use corresponding one of the identifiers demultiplexed by the buffer identification demultiplexer as information concerning a channel to be deleted which is included in the difference information.

The wireless communication device may further include a channel-quality measuring unit that measures channel qualities of the channels. The update channel selector may select the request channels based on a result of a measurement performed by the channel-quality measuring unit.

In the wireless communication device, the update channel selector may extract, from the channel qualities measured by the channel-quality measuring unit, a channel quality of an added channel included in the difference. Additionally, the multiplexer may multiplex the difference information and information indicative of the channel quality extracted by the update channel selector to the signal to be transmitted.

In the wireless communication device, the update channel selector may extract channel qualities of the selected request channels from the channel qualities measured by the channel-quality measuring unit. Additionally, the multiplexer may multiplex the difference information and information indicative of the channel qualities extracted by the update channel selector to the signal to be transmitted.

In the wireless communication device, the update channel selector may extract channel qualities of the selected request channels from the channel qualities measured by the channel-quality measuring unit, and calculate an average value of the extracted channel qualities. Additionally, the multiplexer may multiplex the difference information and information indicative of the average value calculated by the update channel selector to the signal to be transmitted.

A wireless communication device of the present invention transmits a signal to another wireless communication device using a channel allocated to the other wireless communication device from a plurality of channels. The wireless communication device includes: a demultiplexer that demultiplexes, from a reception signal received from the other wireless communication device, difference information indicative of a difference between a group of request channels that are candidates to be allocated to the other wireless communication device and a group of previously requested channels; a request-channel rearranging unit that rearranges the group of the request channels based on the difference information; and a scheduler that selects a channel to be allocated to the other wireless communication device based on the group of the request channels rearranged by the request-channel rearranging unit.

In the wireless communication device, the request-channel rearranging unit may store identifiers of the request channels included in the rearranged group into buffer regions, respectively, and use the identifiers of the request channels respectively stored in the buffer regions at a last rearrangement when the group of the request channels is rearranged. Additionally, the wireless communication device may further include a multiplexer that multiplexes identifiers of the buffer regions respectively storing the identifiers of the request channels to the signal to be transmitted to the other wireless communication device.

A wireless communication device of the present invention transmits a signal to another wireless communication device using a channel allocated to the other wireless communication device from a plurality of channels. The wireless communication device includes: a demultiplexer that demultiplexes, from a reception signal received from the other wireless communication device, difference information indicative of a difference between a group of request channels that are candidates to be allocated to the other wireless communication device and a group of channels previously allocated to the other wireless communication device; a request-channel rearranging unit that rearranges the group of the request channels based on the difference information; and a scheduler that selects a channel to be allocated to the other wireless communication device based on the group of the request channels rearranged by the request-channel rearranging unit.

In the wireless communication device, the request-channel rearranging unit may store identifiers of channels allocated to the other wireless communication device into buffer regions, respectively, and use the identifiers of the channels respectively stored in the buffer regions when the group of the request channels are rearranged. Additionally, the wireless communication device may further include a multiplexer that multiplexes identifiers of the buffer regions respectively storing the identifiers of the channels to the signal to be transmitted.

A wireless communication system of the present invention includes a first wireless communication device and a second wireless communication device that receives a signal using a channel allocated by the first wireless communication device. The second wireless communication device includes: an update channel selector that selects a plurality of request channels that are candidates to be allocated to the second wireless communication device from the channels, calculates a difference between a group of the request channels and a group of previously-selected channels, and generates difference information indicative of the difference; and a multiplexer that multiplexes the difference information to a signal to be transmitted to the first wireless communication device. The first wireless communication device includes: a demultiplexer that demultiplexes the difference information from the signal received from the second wireless communication device; a request-channel rearranging unit that rearranges the group of the request channels based on the difference information demultiplexed by the demultiplexer; and a scheduler that selects a channel to be allocated to the second wireless communication device based on the group of the request channels rearranged by the request-channel rearranging unit.

A wireless communication system of the present invention includes a first wireless communication device and a second wireless communication device that receives a signal using a channel allocated by the first wireless communication device. The second wireless communication device includes: an update channel selector that selects a plurality of request channels that are candidates to be allocated to the second wireless communication device from the channels, calculates a difference between a group of the request channels and a group of channels allocated by the first wireless communication device, and generates difference information indicative of the difference; and a multiplexer that multiplexes the difference information to a signal to be transmitted to the first wireless communication device. The first wireless communication device includes: a demultiplexer that demultiplexes the difference information from the signal received from the second wireless communication device; a request-channel rearranging unit that rearranges the group of the request channels based on the difference information demultiplexed by the demultiplexer; and a scheduler that selects a channel to be allocated to the second wireless communication device based on the group of the request channels rearranged by the request-channel rearranging unit.

EFFECTS OF THE INVENTION

According to the present invention, request channels that are candidates to be allocated are specified based on difference information. Therefore, a wireless reception device, a wireless transmission device, a wireless communication system, and a wireless communication method for reducing the amount of information to be fed back through a reverse link can be provided.

BRIEF DESCRIPTION OF THE DRAWINGS

FIG. 7 illustrates an example of information output by the update channel selector 301 according to the first embodiment.

FIG. 8 illustrates an example of update results stored in the storage 302 according to the first embodiment.

FIG. 23 illustrates an example of an output of a channel-quality averaging unit 2201 according to the seventh embodiment.

FIG. 24 illustrates an example of report information according to an eighth embodiment of the present invention.

Figure 1:
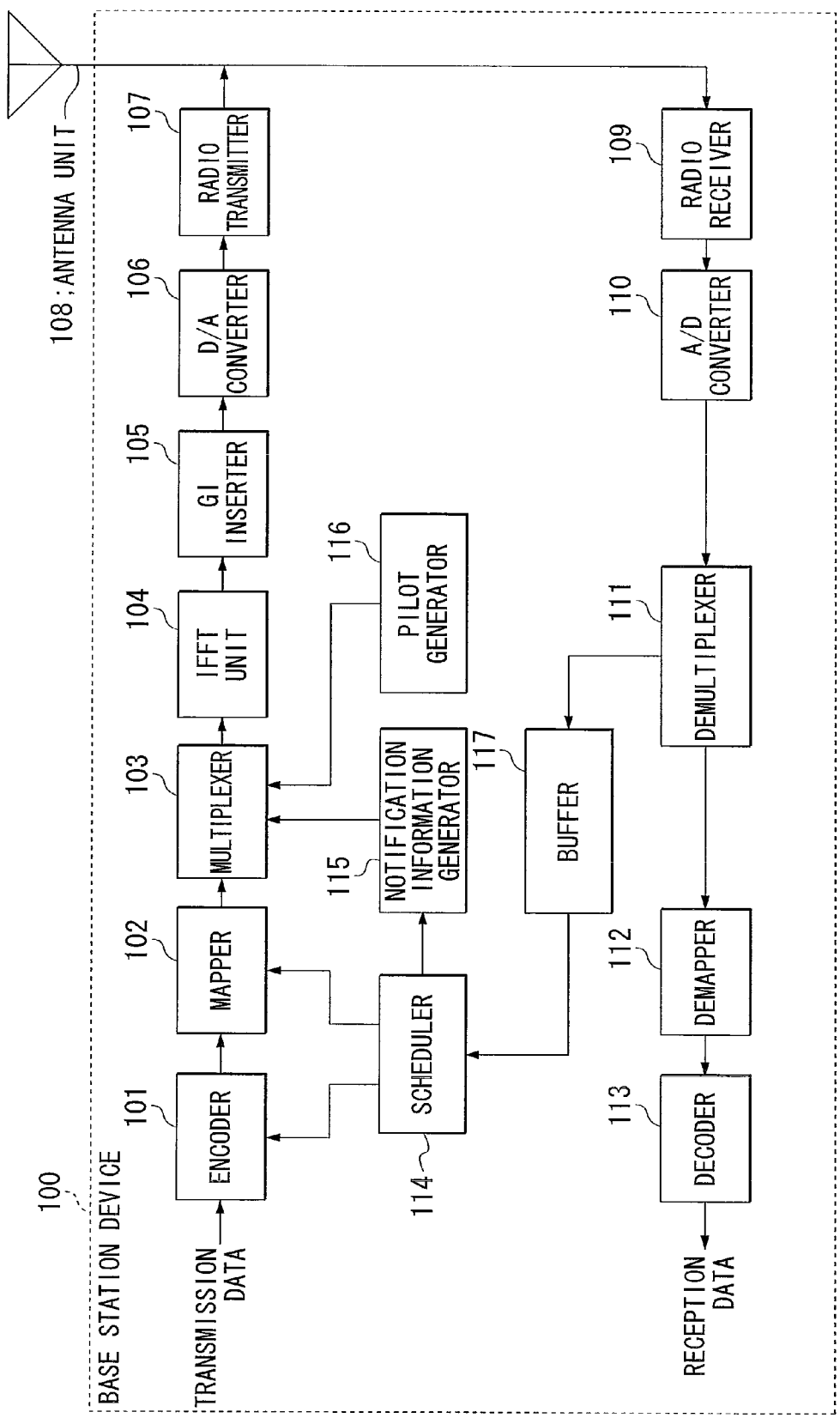
FIG. 1 is a block diagram illustrating the configuration of a base station device 100 according to a first embodiment of the present invention.

DESCRIPTION OF REFERENCE NUMERALS 100, 900, 1400, and 1900 base station
101 encoder
102 mapper
103 multiplexer
104 IFFT unit
105 GI inserter
106 D/A converter
107 radio transmitter
108 antenna unit
109 radio receiver
110 A/D converter
111 demultiplexer
112 demapper
113 decoder
114 and 901 scheduler
115 and 1402 notification information generator
116 pilot generator
117, 902, 1401, and 1901 buffer
200, 1000, 1500, and 2000 terminal device
201 antenna unit
202 radio receiver 203 A/D converter
204 GI remover
205 FFT unit
206 demultiplexer
207 demapper
208 decoder
209 channel-quality measuring unit
210, 1001, 1501, and 2001 report information generator
211 encoder
212 mapper
213 multiplexer
214 D/A converter
215 radio transmitter
216, 1002, 1502, and 2002 demodulation controller
301 and 1601 update channel selector
302 storage
303, 1603, and 2202 report-information symbol generator
2201 channel-quality averaging unit

BEST MODE FOR CARRYING OUT THE INVENTION

Although the case where a modulation parameter, such as a transmission rate or an MCS (Modulation and Coding Scheme) indicative of a modulation scheme and a coding rate, is used as channel quality information is explained in the following embodiments, the channel quality information is not limited to the modulation parameter. For example, indicators indicative of channel qualities correlated with the reception signal power or the carrier power, such as CINR (Carrier-to-Interference plus Noise Ratio), RSSI (Received Signal Strength Indicator), SNR (Signal to Noise Ratio), SIR (Signal to Interference Ratio), SINR (Signal to Interference plus Noise Ratio), CNR (Carrier to Noise Ratio), or CIR (Carrier to Interference Ratio), may be used.

Although a channel indicates one or multiple subcarriers and scheduling for multiple channels is explained in the following embodiments, the present invention is applicable not only to channels in a frequency domain, but also to a communication system using multiple channels, such as channels in a unique mode for SDMA (Space Division Multiple Access) or a combination of these channels. Therefore, the present invention is applicable to a system in which channel quality might differ for each channel.

Although an OFDMA downlink from a base station device to a terminal device and a reverse link (uplink) for feedback of report information from the terminal device to the base station device are explained on the assumption of a cellular system in the following embodiments, the present invention is not limited thereto. Between two wireless communication devices, a device that reports information indicative of channels and channel qualities thereof (device having a function of transmitting report information) is regarded as a terminal device. On the other hand, a device that allocates transmission data to each channel based on the reported information indicative of the channels and the channel qualities thereof (device having an allocation function) is regarded as a base station device. One wireless communication device can have both functions in some cases.

In the description, a wireless communication device is a device that executes wireless communication and includes a base station device, a terminal device, a radio device, a mobile terminal device, a cellular phone, and the like. The present invention is applicable to wireless communication devices, any one of which can execute allocation, and another of which can transmit report information.

[First Embodiment]

Figure 2:
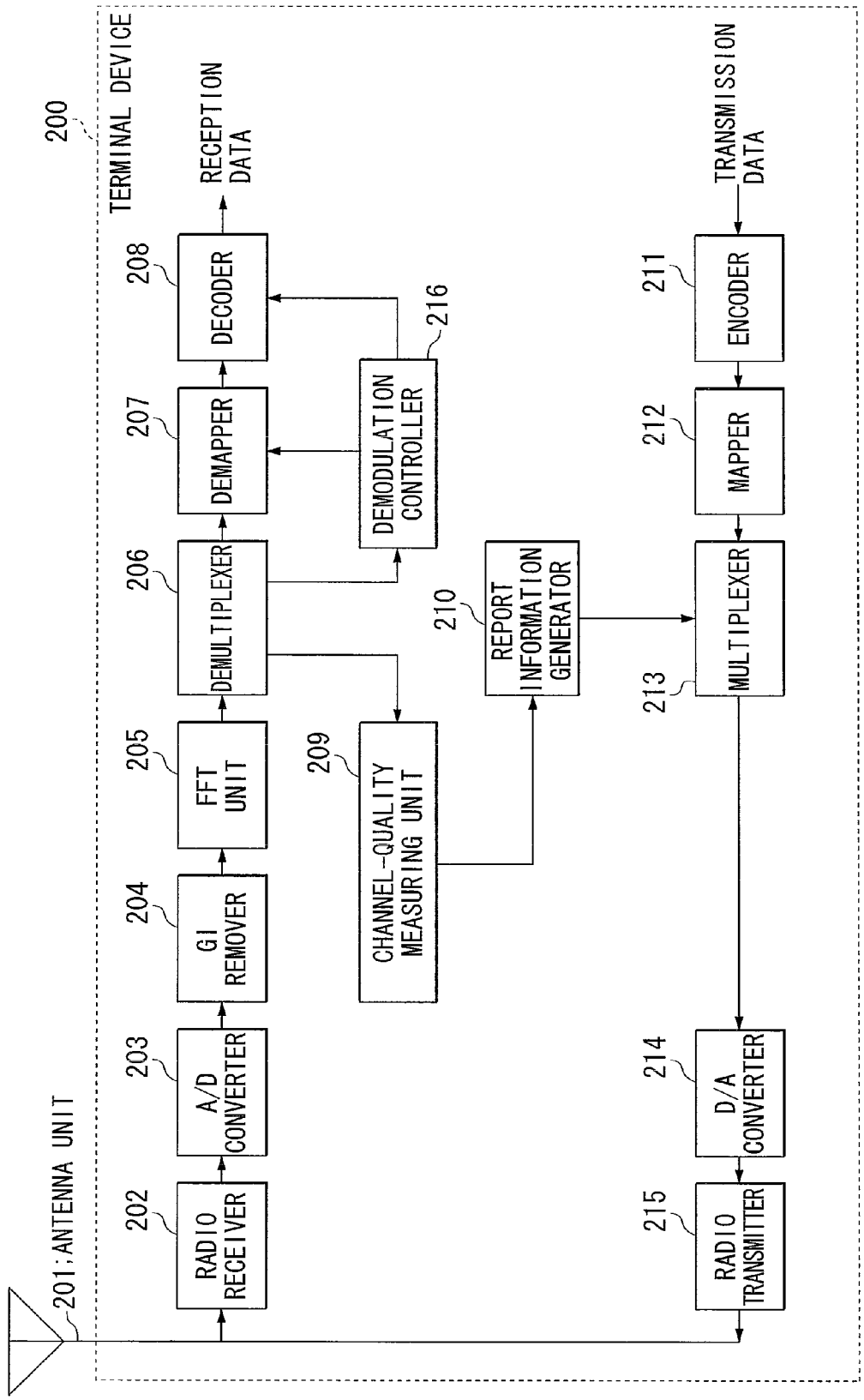
FIG. 2 is a block diagram illustrating the configuration of a terminal device 200 according to the first embodiment.

Hereinafter, a first embodiment of the present invention is explained with reference to the accompanying drawings. FIG. 1 is a schematic block diagram illustrating the configuration of a base station 100 according to the first embodiment. FIG. 2 is a schematic block diagram illustrating the configuration of a terminal device 200 according to the first embodiment.

The base station device 100 includes an encoder 101, a mapper 102, a multiplexer 103, an IFFT (Inverse Fast Fourier Transform) unit 104, a GI (Guard Interval) inserter 105, a D/A (Digital-to-Analog) converter 106, a radio transmitter 107, an antenna unit 108, a radio receiver 109, an A/D (Analog-to-Digital) converter 110, a demultiplexer 111, a demapper 112, a decoder 113, a scheduler 114, a notification information generator 115, a pilot generator 116, and a buffer (request-channel rearranging unit) 117.

The terminal device 200 includes an antenna unit 201, a radio receiver 202, an A/D converter 203, a GI remover 204, an FFT (Fast Fourier Transform) unit 205, a demultiplexer 206, a demapper 207, a decoder 208, a channel-quality measuring unit 209, a report information generator 210, an encoder 211, a mapper 212, a multiplexer 213, a D/A converter 214, a radio transmitter 215, and a demodulation controller 216.

Hereinafter, a process of the base station device 100 transmitting signals and then the terminal device 200 receiving the transmitted signals is explained with reference to FIGS. 1 and 2.

In the base station device 100, the encoder 101 performs error correction coding and modulation on input transmission data based on modulation parameter information and scheduling information that are indicated by the scheduler 114 to generate data symbol strings of the transmission data. The mapper 102 allocates the data symbol strings to subcarriers based on the modulation parameter information and the scheduling information that are indicated by the scheduler 114. The multiplexer 103 multiplexes the mapped data-symbol strings, a symbol string for notification information generated by the notification information generator 115, and a pilot symbol string generated by the pilot generator 116. The IFFT unit 104 performs IFFT on the symbol strings allocated to the respective subcarriers, converts the symbol strings into a time domain signal to be output to the GI inserter 105. The GI inserter 105 adds a guard interval GI to the signal generated by the IFFT unit 104. The D/A converter 106 converts the signal to which the guard interval GI has been added into an analog signal The radio transmitter 107 upconverts the analog signal to be transmitted to the terminal device 200 through the antenna unit 108.

In the terminal device 200, the radio receiver 202 receives the signal transmitted from the base station device 100 through the antenna unit 201. The A/D converter 203 converts the analog signal received and downconverted by the radio receiver 202 into a digital signal. The GI remover 204 removes the guard interval GI from the digital signal and outputs the signal from which the guard interval GI has removed to the FFT unit 205. The FFT unit 205 performs FFT to convert the signal output from the GI remover 204 into frequency-domain symbol strings. The demultiplexer 206 extracts a pilot symbol string, a notification-information symbol string, and a data symbol string from the symbol strings output from the FFT unit 205. Then, the demultiplexer 206 outputs the pilot symbol string, the notification-information symbol string, and the data symbol string to the channel-quality measuring unit 209, the demodulation controller 216, and the demapper 207, respectively. The demodulation controller 216 demodulates the notification-information symbol string to obtain notification information, and outputs scheduling information (information concerning the channels allocated to the transmission data addressed to the terminal device 200) and modulation parameter information which are extracted from the notification information to the demapper 207 and the decoder 208. The demapper 207 demodulates the data symbol strings output from the demultiplexer 206 based on the scheduling information and the modulation parameter information which are received from the demodulation controller 216. Based on the scheduling information and the modulation parameter information which are received from the demodulation controller 216, the decoder 208 decodes an error correction code of data obtained from the data symbol strings being demodulated and extracts reception data.

Hereinafter, a process of the terminal device 200 feeding back report information to the base station device 100 is explained with reference to FIGS. 1 and 2.

The channel-quality measuring unit 209 measures the channel quality of each channel using the pilot symbol string received from the demultiplexer 206, and outputs the channel-quality measurement results to the report information generator 210. Although the case where channel qualities are measured using a pilot symbol string is explained, the present invention is applicable to channel quality measurement using a data symbol string, as a matter of course. The report information generator 210 selects request channels that are candidates to be allocated based on the channel-quality measurement results received from the channel-quality measuring unit 209. Based on the request channels, the report information generator 210 generates report information (delete channel information, additional channel information, and channel quality information concerning an additional channel) to be fed back to the base station 100. Then, the report information generator 210 modulates the report information to generate a report-information symbol string. The report information generator 210 will be explained in detail later. The multiplexer 213 multiplexes the report-information symbol string generated by the report information generator 210 and the data symbol strings generated by the encoder 211 and the mapper 212 performing error correction coding and modulation on transmission data to generate a feedback signal addressed to the base station device 100, and outputs the feedback signal to the D/A converter 214. If there is no transmission data to be transmitted from the terminal device 200 to the base station 100, the multiplexer 213 can output only the report-information symbol string. The D/A converter 214 coverts the feedback signal received from the multiplexer 213 into an analog signal. The radio transmitter 215 upconverts the analog signal to be transmitted to the base station 100 through the antenna unit 201.

In the base station 100, the radio receiver 109 receives the signal transmitted from the terminal device 200 through the antenna unit 108. After the radio receiver 109 downconverts the received analog signal, the A/D converter 110 converts the analog signal into a digital signal to be output to the demultiplexer 111. The demultiplexer 111 demultiplexes the report-information symbol string and the data symbol strings from the digital signal (symbol string) received from the A/D converter 110. Then, the demultiplexer 111 outputs the report-information symbol string and the data symbol strings to the buffer 117 and the demapper 112, respectively. The demapper 112 and the decoder 113 demodulates and decodes the data symbol strings demultiplexed by the demultiplexer 111 to extract reception data.

The buffer 117 stores the channel numbers of multiple request channels (channels that are candidates to be allocated) and channel quality information concerning the request channels based on the report information previously reported by the terminal device 200. When a report-information symbol string is received from the demultiplexer 111, the buffer 117 updates the stored channel numbers of multiple request channels and the stored channel quality information concerning the request channels based on report information obtained by the report-information symbol string being demodulated. The detailed operations performed by the buffer 117 will be explained later together with operations performed by the report information generator 210 included in the terminal device 200.

After the stored channel numbers of the multiple request channels and the stored channel quality information concerning the request channels have been updated, the buffer 117 outputs the updated channel numbers of the multiple request channels and the updated channel quality information concerning the request channels to the scheduler 114. If the base station device 100 is in communication with multiple terminal devices 200, the buffer 117 stores the channel numbers of multiple request channels and the channel quality information concerning the request channels for each of the terminal devices 200, and outputs these information items to the scheduler 114. The scheduler 114 determines channels to which transmission data addressed to each terminal device 200 is to be allocated based on the channel numbers of the request channels and the channel quality information concerning the request channels which are received from the buffer 117, and determines modulation parameters for the respective transmission data. Although request channels are channels that are candidates to be allocated, the scheduler 114 does not always have to allocate transmission data addressed to each terminal device 200 to the request channels reported from the terminal device 200. For example, the scheduler 114 may allocate transmission data to a channel which is not selected as the request channel by any terminal device 200. After the scheduling, the scheduler 114 outputs scheduling information (information indicative of a relationship between each channel and a corresponding terminal device) and modulation parameter information to the encoder 101, the mapper 102, and the notification information generator 115. The notification information generator 115 generates a notification-information symbol string for indicating the scheduling information and the modulation parameter information which are received from the scheduler 114, and outputs the generated notification-information symbol string to the multiplexer 103. Then, similar operations as explained above follow until transmission.

Figure 3:
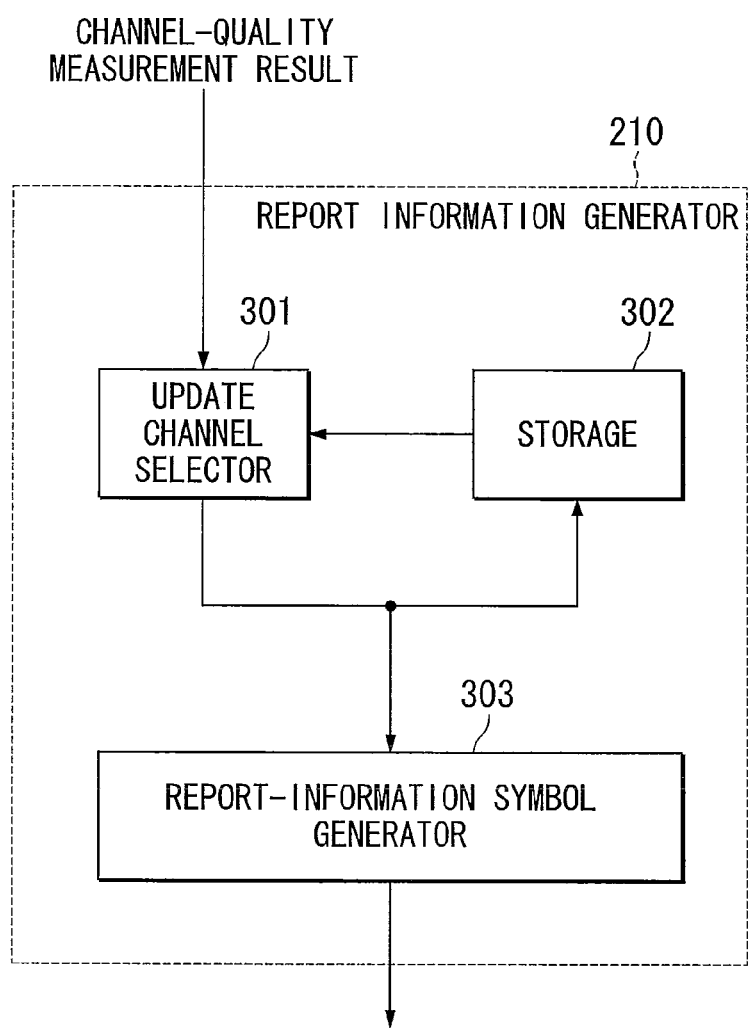
FIG. 3 is a block diagram illustrating the inner configuration of a report information generator 210 according to the first embodiment.

FIG. 3 is a schematic block diagram illustrating the inner configuration of the report information generator 210. Hereinafter, operations performed by the report information generator 210 are explained in more detail with reference to FIG. 3.

The update channel selector 301 receives the channel-quality measurement results output from the channel-quality measuring unit 209. The storage 302 stores the channel numbers of multiple request channels and channel quality information concerning the request channels which have previously been updated, and outputs the channel numbers of the request channels and the channel quality information concerning the request channels which have previously been updated to the update channel selector 301. The update channel selector 301 selects a channel to be deleted and a channel to be added from the previously-updated request channels based on the channel-quality measurement results and the channel numbers of the previously-updated request channels and channel quality information concerning the previously-updated request channels. After the channel to be deleted and the channel to be added are selected, the update channel selector 301 outputs delete channel information indicative of the channel to be deleted, additional channel information indicative of the channel to be added, and the channel quality information concerning the channel to be added to the storage 302 and the report-information symbol generator 303. In other words, the update channel selector 301 calculates the difference between a group of the previously-updated request channels and a group of currently-selected request channels, and outputs channel quality information concerning the channel to be added in addition to the additional channel information and the delete channel information that are information indicative of the calculated difference.

Based on the delete channel information, the additional channel information, and the channel quality information concerning the channel to be added which have been received from the update channel selector 301, the storage 302 updates the stored request channel information and channel quality information concerning the request channels. In other words, the storage 302 deletes the channel number specified by the delete channel information and the channel quality information corresponding to the specified channel number from the stored items, and stores the channel number specified by the additional channel information and the channel quality information concerning the specified channel number correlated with each other. The report-information symbol generator 303 generates a report-information symbol string for reporting, to the base station device 100, the delete channel information, the additional channel information, and the channel quality information concerning the channel to be added which have been received from the update channel selector 301, and outputs the generated report-information symbol string.

On the other hand, the buffer 117 included in the base station device 100 stores information similar to that stored in the storage 302 included in the terminal device 200. In other words, the buffer 117 updates the stored request channel information and channel quality information concerning the request channels based on the report information (the delete channel information, the additional channel information, and the channel quality information concerning the channel to be added) similarly to the storage 302 when the report information is received from the terminal device 200. Thus, information items stored in the buffer 117 included in the base station 100 is reconfigured so as to be identical to those stored in the storage 302 included in the terminal device 200.

Hereinafter, operations performed by the report-information generator 210 included in the terminal device 200 are explained with reference to specific examples.

Figures 4, 5, 6:
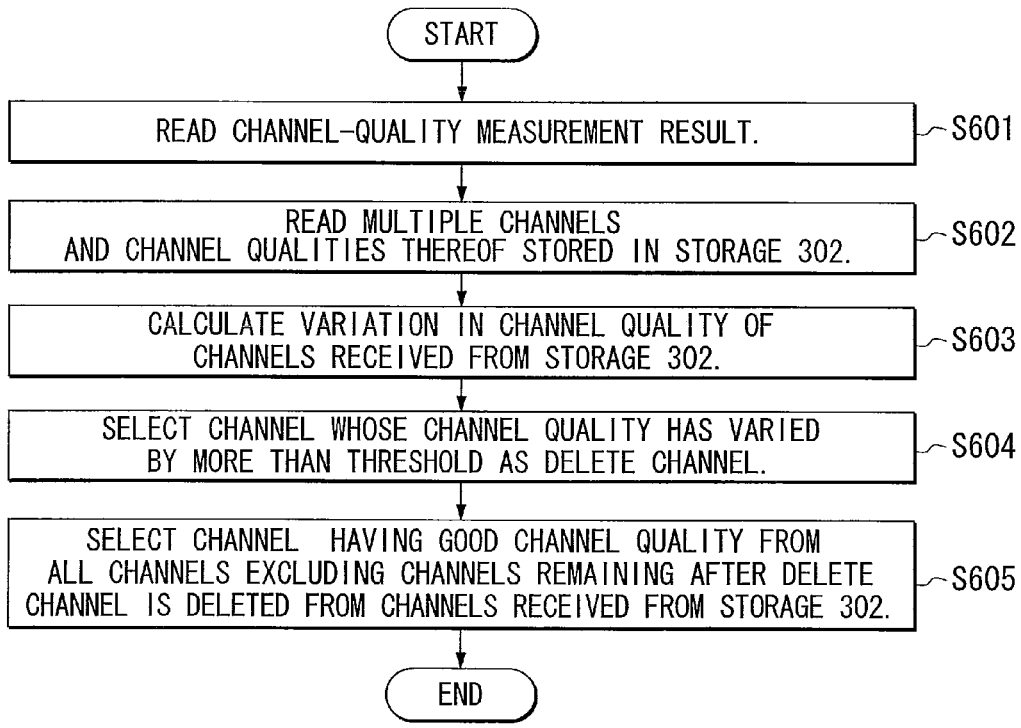
FIG. 4 illustrates an example of channel-quality measurement results indicated by the channel-quality measuring unit 209 according to the first embodiment.
FIG. 5 illustrates an example of relationships between request channel information and channel quality information which are stored in a storage 302 according to the first embodiment.
FIG. 6 is a flowchart illustrating operations performed by an update channel selector 301 according to the first embodiment.

The information shown in FIG. 4 ("C1 and 6", "C2 and 9", "C3 and 10", "C4 and 6", "C5 and 3", and "C6 and 8" which are groups of the channel numbers and the channel-quality measurement results) is an example of the channel-quality measurement results indicated by the channel-quality measuring unit 209. The information shown in FIG. 5 ("C1 and 7", "C2 and 9", and "C3 and 10" which are groups of the channel numbers and channel quality information) is an example of information concerning multiple request channels and channel quality information concerning the request channels which are stored in the storage 302. The channel-quality measurement results shown in FIG. 4 and the channel quality information shown in FIG. 5 are represented by the numbers of 0 to 10 indicating that the greater the number is, the better the channel quality is. FIG. 6 is a flowchart illustrating operations performed by the update channel selector 301.

The update channel selector 301 reads the channel-quality measurement results that are shown in FIG. 4 and received from the channel-quality measuring unit 209 (step S601). Further, the update channel selector 301 reads information concerning multiple channels and channel qualities thereof which are shown in FIG. 5 from the storage 302 (step S602). Then, the update channel selector 301 calculates variations in channel quality (1, 0, and 0) of the request channels (C1, C2, and C3 in this case) based on the channel qualities (7, 9, and 10) of the request channels read from the storage 302 and the channel-quality measurement results (6, 9, and 10) corresponding to the request channels which are received from the channel-quality measuring unit 209 (step S603). The variations between the channel qualities of the request channels and the channel-quality measurement results are absolute values of differences in those values. Further, the update channel selector 301 selects a channel (channel C1 in this case) whose variation in channel quality is equal to or more than a threshold (1 in this case) as a channel to be deleted (step S604). Finally, the update channel selector 301 selects, as a channel to be added, a channel having a good channel quality (channel C6 in this case) from among all channels excluding the channels (C2 and C3) remaining after the delete channel (C1) is deleted from the channels (C1, C2, and C3) received from the storage 302, i.e., from among the channels C1, C4, C5, and C6 (step 605). As a result, the delete channel number "C1", the additional channel number "C6", and the channel quality of the additional channel "8" are output from the update channel selector 301 as shown in FIG. 7.

The update channel selector 301 outputs the information shown in FIG. 7 (the delete channel number "C1", the additional channel number "C6", and the channel quality of the additional channel "8") to the storage 302. Based on the information, the storage 302 updates the stored information to the information shown in FIG. 8 (the channel numbers "C2", "C3", and "C6" respectively corresponding to channel qualities "9", "10" and "8") by deleting the channel C1 from the information shown in FIG. 5 (the combinations of the channel numbers and the channel qualities "C1 and 7", "C2 and 9", and "C3 and 10") and adding the channel C6 and the channel quality "8" thereof.

The case where the number of channels whose variations in channel quality are equal to or more than the threshold is one has been explained. However, the given number (1 in this case) of channels corresponding to that of channels to be added may be selected from the channels whose variations in channel quality are largest if the number of channels whose variations in channel quality are equal to or more than the threshold is two or more, or zero. In other words, all channels whose variations in channel quality are equal to or more than the threshold are regarded as delete channels, and the same number of channels as that of the delete channels is selected as channels to be added in the first embodiment. However, the number of delete channels may be limited to a given value so that the given number of channels having the largest variations in channel quality are selected as delete channels from among channels whose variations in reception quality are equal to or more than the threshold, and that the same number of channels as that of the delete channels are selected as channels to be added. In this case, only channels whose variations in channel quality are equal to or more than the threshold are selected as the delete channels and the same number of additional channels as that of the delete channels is selected if the number of channels whose variations in channel quality are equal to or more than the threshold is less than the given value. Alternatively, the number of delete channels may be limited to a given value so that the given number of channels is selected as the delete channels from among the channels having the largest variations in channel quality, and that the same number of additional channels as that of the delete channels is selected.

Although the condition that a variation in channel quality is equal to or more than a threshold when a delete channel is selected has been used, the condition is not limited thereto. For example, a condition that a variation in channel quality (a value obtained by subtracting the channel-quality measurement result received from the channel-quality measuring unit 209 from the channel quality of the request channel read from the storage 302) is equal to or less than a threshold (for example, "−2") may be used so that a channel having a channel quality that has been greatly degraded is selected as the delete channel.

Although the case where the number of request channels, delete channels, and additional channels are respectively 3, 1, and 1 has been explained in the first embodiment, this is just one example. As a matter of course, the number of these channels may be another fixed value or a variable value.

As explained above, according to the first embodiment, the terminal device 200 selects some channels that are candidates to which transmission data to be addressed to the terminal device 200 is to be allocated from all channels. When the terminal device 200 indicates channel quality information concerning the selected channels to the base station device, the terminal device 200 indicates only delete channel information and additional channel information with respect to the previously selected channels, as channel information. Therefore, the amount of report information can be reduced compared with the case where information concerning all of the selected channels is reported, and overhead caused by feedback can be reduced.

Further, the update channel selector 301 included in the terminal device 200 selects a channel having a channel quality which has greatly varied since the previous selection as a delete channel. Therefore, the channel that has been previously and currently selected has a small variation in channel quality. For this reason, the scheduler 114 can allocate transmission data to an adequate channel using the previously-updated channel quality information even if the amount of report information is reduced by not including channel quality information concerning the channel that has been previously and currently selected as a request channel in the report information.

[Second Embodiment]

Figure 9:
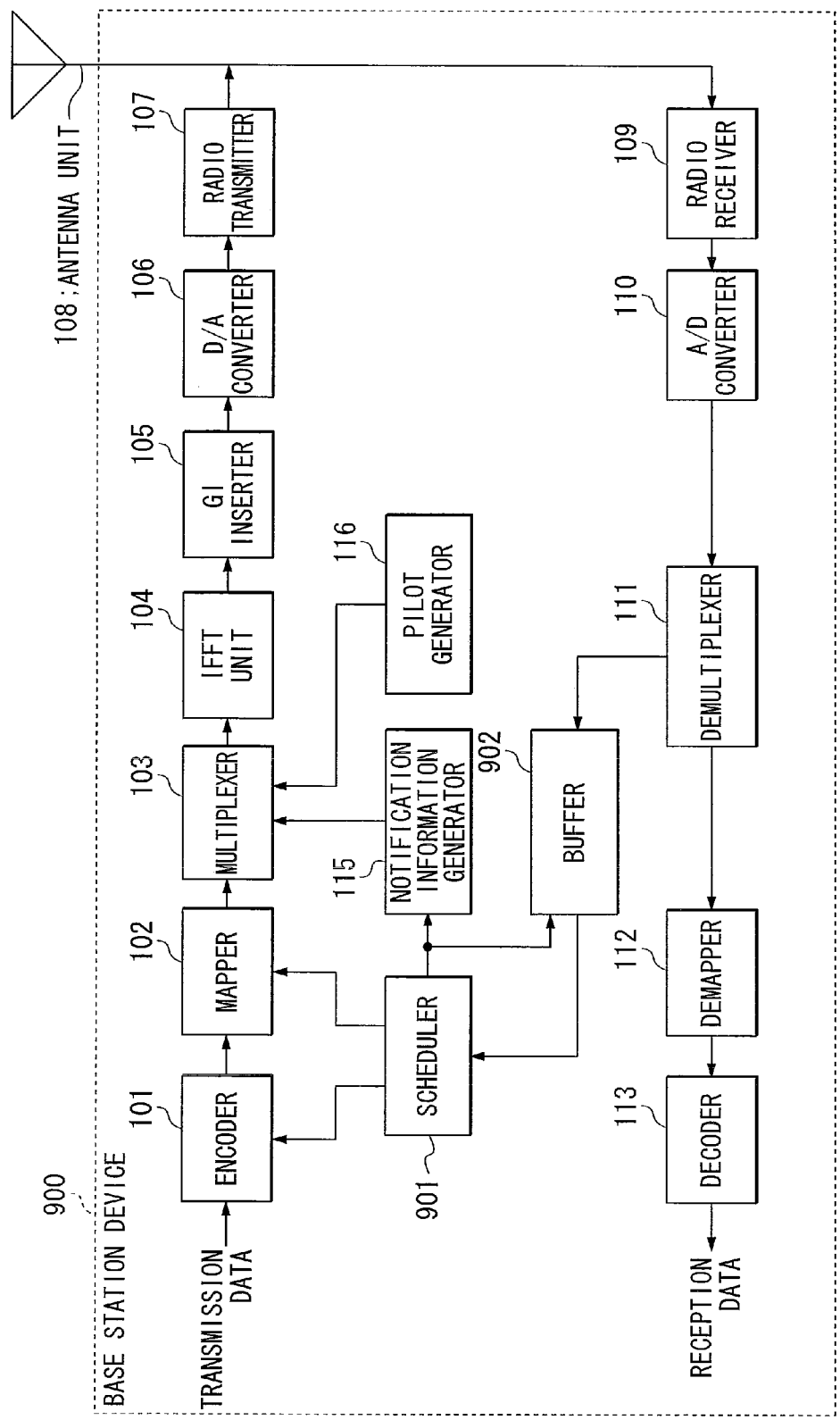
FIG. 9 is a block diagram illustrating the configuration of a base station device 900 according to a second embodiment of the present invention.
Figure 10:
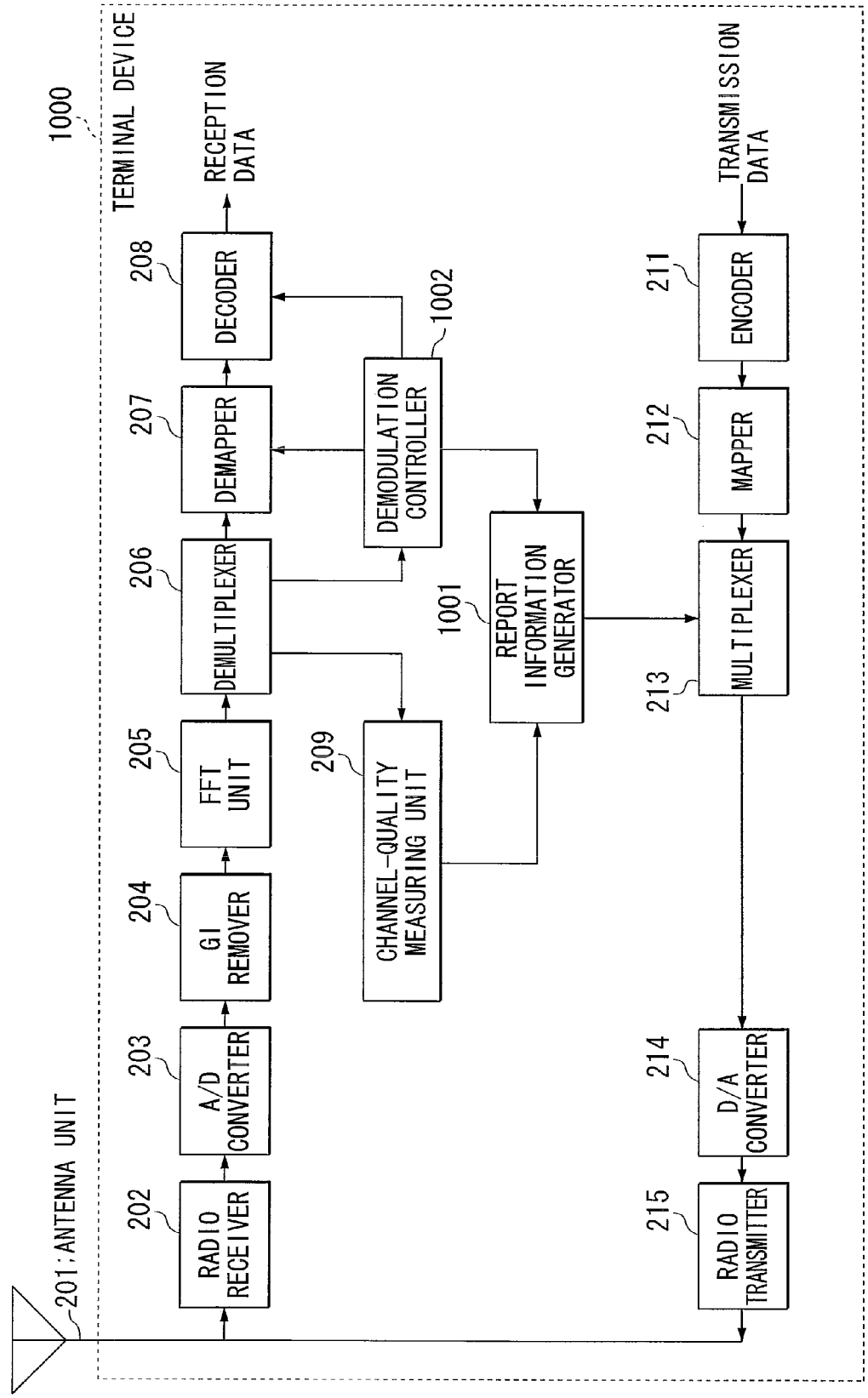
FIG. 10 is a block diagram illustrating the configuration of a terminal device 1000 according to the second embodiment.

FIG. 9 is a schematic block diagram illustrating the configuration of a base station device 900. FIG. 10 is a schematic block diagram illustrating the configuration of a terminal device 1000. Like reference numerals shown in FIGS. 9 and 10 represent like units of the first embodiment (FIGS. 1 and 2), and explanations thereof are omitted.

The base station device 900 includes the encoder 101, the mapper 102, the multiplexer 103, the IFFT unit 104, the GI inserter 105, the D/A converter 106, the radio transmitter 107, the antenna unit 108, the radio receiver 109, the A/D converter 110, the demultiplexer 111, the demapper 112, the decoder 113, a scheduler 901, the notification information generator 115, the pilot generator 116, and a buffer (request-channel rearranging unit) 902.

The terminal device 1000 includes the antenna unit 201, the radio receiver 202, the A/D converter 203, the GI remover 204, the FFT unit 205, the demultiplexer 206, the demapper 207, the decoder 208, the channel-quality measuring unit 209, a report information generator 1001, the encoder 211, the mapper 212, the multiplexer 213, the D/A converter 214, the radio transmitter 215, and a demodulation controller 1002.

Hereinafter, the scheduler 901, the buffer 902, the report information generator 1001, and the demodulation controller 1002 that perform processing different from that of the first embodiment (FIGS. 1 and 2) are mainly explained. The case where the terminal device 1000 reports a modulation parameter as channel quality information to the base station device 900 is explained in the second embodiment.

The scheduler 901 included in the base station device 900 outputs scheduling information and modulation parameter information that are the results of scheduling not only to the encoder 101, the mapper 102, and the notification information generator 115, but also to the buffer 902. The buffer 902 stores the numbers of multiple used channels (information indicative of the channels allocated to the transmission data addressed to each terminal device 1000) and channel quality information (modulation parameter) concerning the used channels, which have previously been updated. The buffer 902 receives the scheduling information and the modulation parameter information from the scheduler 901, and then updates the information concerning the multiple used channels and the channel qualities thereof which are stored in the buffer 902 to the information received from the scheduler 901.

Based on the notification-information symbol string received from the demultiplexer 206, the demodulation controller 1002 included in the terminal device 1000 generates scheduling information and modulation parameter information, and outputs the generated information not only to the demapper 207 and the decoder 208, but also to the report information generator 1001.

The report information generator 1001 generates a report-information symbol string based on the channel-quality measurement results for each channel received from the channel-quality measuring unit 209, the scheduling information received from the demodulation controller 1002 (used channel information: information concerning channels allocated to the transmission data addressed to the terminal device 1000) and the channel quality information concerning the used channels (modulation parameter), and outputs the generated report-information symbol string to the multiplexer 213.

Figure 11:
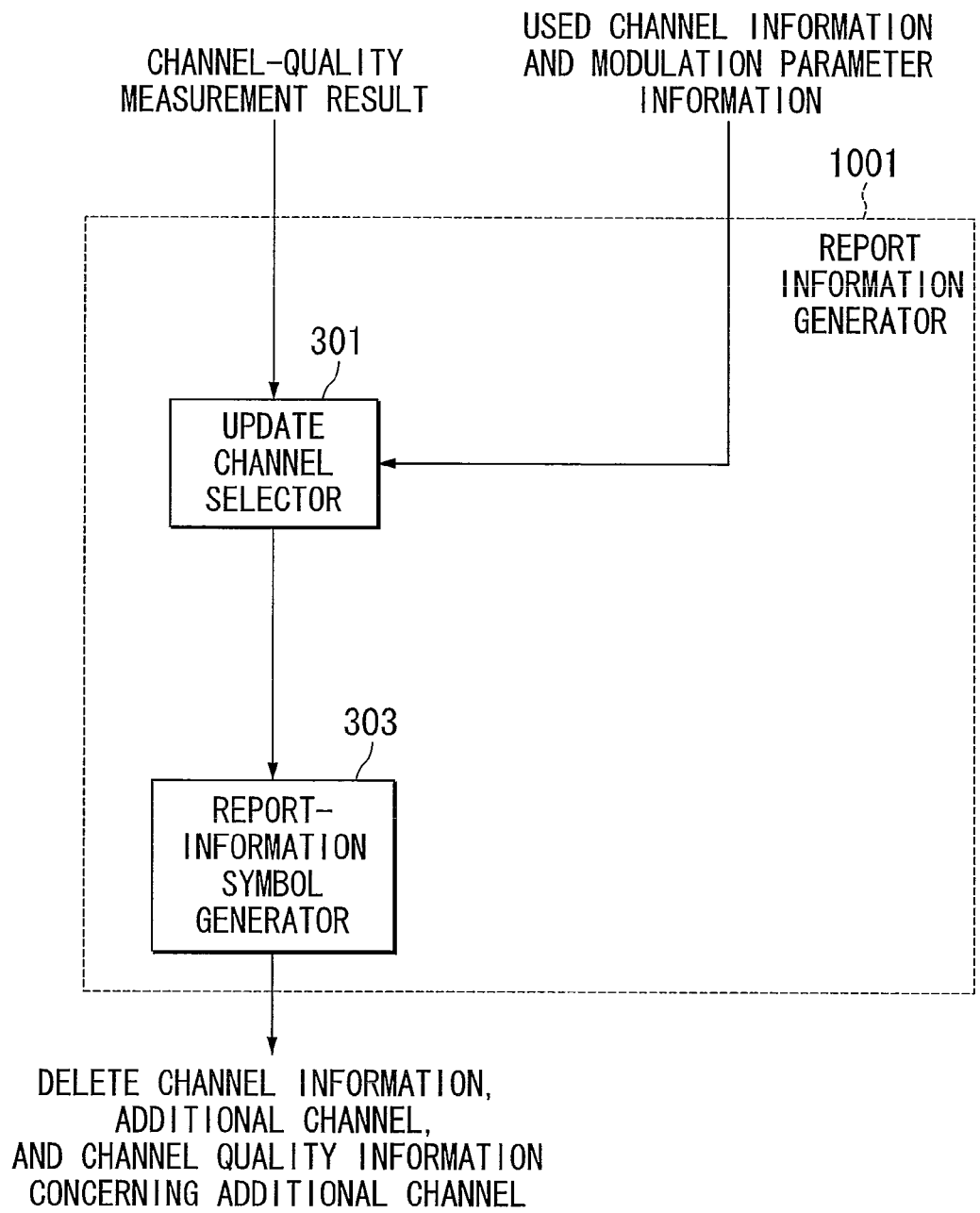
FIG. 11 is a block diagram illustrating the inner configuration of a report information generator 1001 according to the second embodiment.
Figure 12:
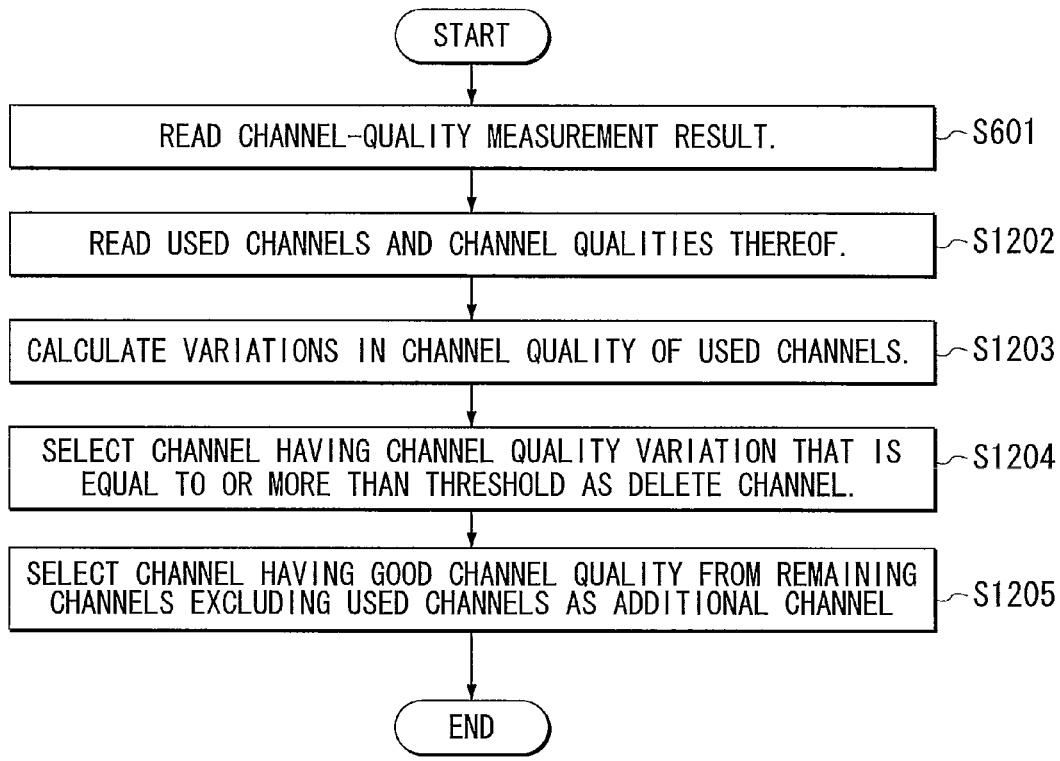
FIG. 12 is a flowchart illustrating operations performed by the update channel selector 301 according to the second embodiment.

FIG. 11 is a schematic block diagram illustrating the inner configuration of the report information generator 001. FIG. 12 illustrates a flowchart of operations performed by the update channel selector 301. The difference from the first embodiment is only input data, and the update channel selector 301 performs similar processing as performed by the update channel selector 301 of the first embodiment (FIG. 3). In other words, the information concerning request channels and channel qualities thereof and the channel-quality measurement results which are stored in the storage 302 is input to the update channel selector 301 in the first embodiment. In the second embodiment, the information concerning used channels and channel qualities thereof and the channel-quality measurement results in lieu of the above information is input to the update channel selector 301. Additionally, the update channel selector 301 calculates the difference between a group of the used channels and a group of currently-selected request channels, and outputs not only additional channel information and delete channel information which are both difference information indicative of the calculated difference, but also channel quality information concerning a channel to be added. In the second embodiment, the used channel information is information indicative of the channels (used channels) allocated by the base station device 900 to the transmission data addressed to the terminal device 1000, and the channel quality information and the channel-quality measurement results are modulation parameters.

The update channel selector 301 reads the channel-quality measurement results from the channel-quality measuring unit 209 (step S601), and also reads used channel information and channel quality information concerning the used channels from the demodulation controller 1002 (step S1202). Then, the update channel selector 301 calculates variations in channel quality of the used channels based on the channel qualities of the used channels received from the demodulation controller 1002 and the channel-quality measurement results received from the channel-quality measuring unit 209 (step S1203). Further, the update channel selector 301 selects a channel having a channel quality variation that is equal to or more than a threshold as a delete channel (step S1204). Finally, the update channel selector 301 selects, as an additional channel, a channel having a good channel quality from among all channels excluding the channels remaining after the delete channel has been deleted from the used channels received from the demodulation controller 1002 (step S1205). Then, the update channel selector 301 outputs delete channel information indicative of the channel to be deleted, additional channel information indicative of the channel to be added, and the channel quality information indicative of the channel quality of the channel to be added.

The case where the number of channels whose variations in channel quality are equal to or more than the threshold is one has been explained. However, the given number (1 in this case) of channels corresponding to that of additional channels may be selected from the channels whose variations in channel quality are largest if the number of channels whose variations in channel quality is equal to or more than the threshold is two or more. In other words, all channels whose variations in channel quality are more than the threshold are selected as delete channels, and the same number of channels as that of the delete channels is selected as additional channels. However, the number of delete channels may be limited to a given value so that the given number of channels having the largest variations in channel quality is selected as delete channels from among channels whose variations in reception quality are equal to or more than the threshold, and that the same number of channels as that of the delete channels are selected as additional channels. In this case, only channels whose variations in channel quality are equal to or more than the threshold are selected as the delete channels and the same number of channels as that of the delete channels is selected as additional channels if the number of channels whose variations in channel quality are equal to or more than the threshold is less than the given value. Specifically, if the given number is "2" and only one channel has a variation in channel quality that is equal to or more than the threshold, only the one channel is selected as a delete channel, and one channel that is the same number of the delete channel is selected as an additional channel. Alternatively, the number of delete channels may be limited to a given value so that the given number of channels is selected as delete channels from among the channels having the largest channel quality variations, and that the same number of channels as that of the deleted channels is selected as additional channels.

Although the condition that a channel quality variation is equal to or more than a threshold when a delete channel is selected has been used, the condition is not limited thereto. For example, a condition that a channel quality variation (a value obtained by subtracting the channel-quality measurement result received from the channel quality measuring unit 209 from the channel quality of the used channel read from the storage 1002) is equal to or less than a threshold (for example, "−2") may be used so that a channel having a channel quality that has greatly degraded is selected as a delete channel.

Although the case where the number of request channels, delete channels, and additional channels are respectively 3, 1, and 1 has been explained in the second embodiment, this is just one example. As a matter of course, the number of these channels may be another fixed value or a variable value.

If the report information (the delete channel information, the additional channel information, and the channel quality information concerning the additional channel) is received from the terminal device 1000, the buffer 902 included in the base station device 900 shown in FIG. 9 updates, based on the report information, the stored used-channel information and the stored channel quality information (modulation parameter) concerning the used channels which have been updated at the time of the previous scheduling, and outputs the updated information to the scheduler 901. In other words, the buffer 902 outputs channel information obtained by deleting a channel indicated by the delete channel information from the used channel information and adding a channel indicated by the additional channel information thereto, and channel quality information concerning these channels to the scheduler 901. At this time, the information stored in the buffer 902 is not updated. As explained above, this information is updated based on the scheduling information and the modulation parameter information that are received from the scheduler 901 after scheduling is performed by the scheduler 901.

As explained above, according to the second embodiment, the terminal device 1000 selects some channels that are candidates to which transmission data to be addressed to the terminal device 200 is to be allocated from all channels. When the terminal device 1000 indicates channel quality information concerning the selected request channels to the base station device 900, the terminal device 1000 indicates only delete channel information and additional channel information with respect to the allocated channels as information concerning the request channels. Therefore, the amount of report information can be reduced compared with the case where information concerning all of the selected channels is reported, and overhead caused by feedback can be reduced. Further, only channel quality information concerning the additional channel is reported upon channel quality information concerning the selected channels being reported. Therefore, the amount of report information can be reduced compared with the case where information concerning all of the selected channels is reported, and overhead caused by feedback can be reduced.

In the second embodiment, the update channel selector 301 compares the request channels and the allocated channels, and generates the delete channel information and the additional channel information. Therefore, the storage 302 for storing the previous request information is not necessary compared with the first embodiment, thereby reducing the size of the circuit.

[Third Embodiment]

Figure 13:
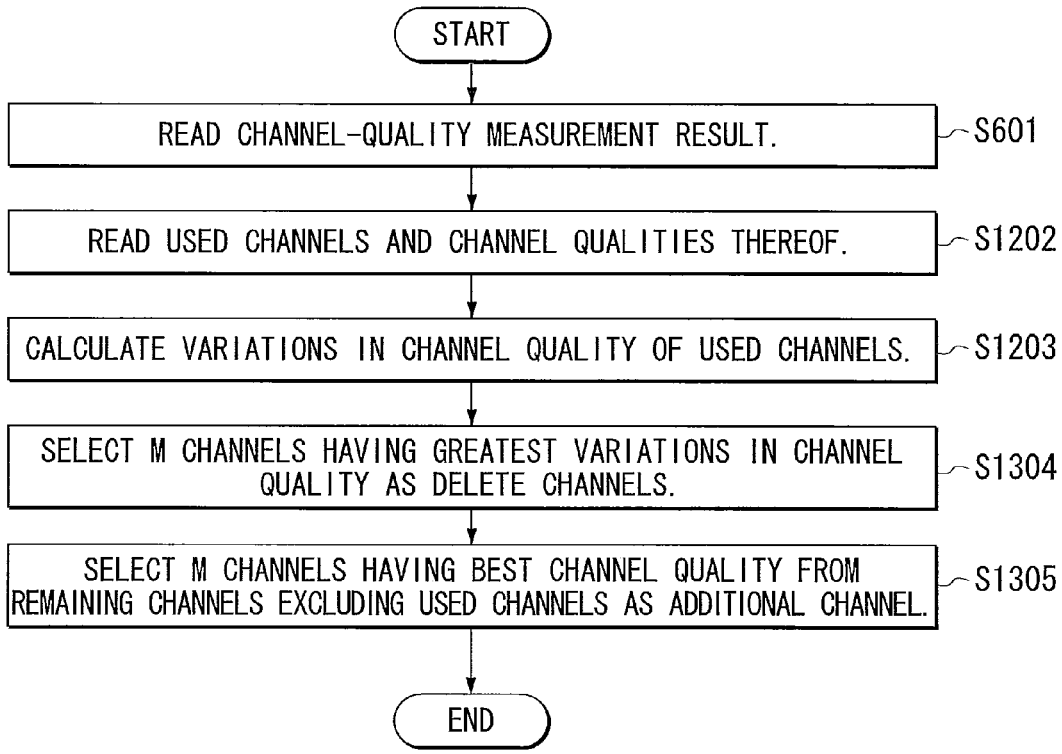
FIG. 13 is a flowchart illustrating operations performed by the update channel selector 301 according to a third embodiment of the present invention.

Although it has been explained in the second embodiment that the update channel selector 301 selects a delete channel and an additional channel based on an evaluation using a threshold, the third embodiment is a modification of the second embodiment where a delete channel and an additional channel are selected by limiting (or fixing) the number of update channels. FIG. 13 illustrates a flowchart of operations performed by the update channel selector 301 of the third embodiment.

The update channel selector 301 reads the channel-quality measurement results (step S601), and then reads used channel information and channel quality information concerning the used channels (step S1202). Then, the update channel selector 301 compares the channel-quality measurement results read at step S601 and the channel quality information read at step S1202, and then calculates variations in channel quality of the used channels (step S1203). Then, the update channel selector 301 selects M channels having the largest variations in channel quality as delete channels (step S1304). Then, the update channel selector 301 selects, as additional channels, M channels having good channel qualities from among all channels excluding the used channels from which the delete channels has been deleted (step S1305).

Although a condition that a variation in channel quality is large is used when the delete channels are selected, the condition is not limited thereto. For example, a condition that a variation in channel quality (value including a sign) is small (negatively large) may be used so that a channel having a channel quality that has greatly degraded is selected as the delete channel.

Although it has been explained in the third embodiment that the number of delete channels and the additional channels are always given number of channels M, the channel number M may be a fixed value or a variable value. If M is a fixed value, for example, the amount of information to be reported from the terminal device to the base station device can be limited to a given value. On the other hand, an efficient report from the terminal device to the base station device is enabled when M is a variable value and controlled according to time variations of channels.

Although the third embodiment has been explained as a modification of the second embodiment, similar modification of the first embodiment is possible, as a matter of course.

Although the case where request channels are reported from the terminal device to the base station device has been explained in each embodiment, the present invention is not limited thereto. The present invention is similarly applicable to the case where a channel having a bad channel quality is reported instead of the request channel. Thus, only the delete channel information and the additional channel information are reported when information indicative of some channels among all channels is reported from the terminal device to the base station device in the present invention. Therefore, the present invention is applicable not only to the embodiments explained above, but also to a system for reporting information indicative of some channels among all channels.

As explained above, according to the third embodiment, the terminal device can report only the delete channel information and the additional channel information to the base station upon selecting some channels from among all channels and reporting channel quality information concerning the selected channels to the base station. Therefore, the amount of report information can be reduced compared with the case where information concerning all of the selected channels is reported, and overhead caused by feedback can be reduced. Further, only channel quality information concerning the additional channel can be reported upon channel quality information concerning the selected channels being reported. Therefore, the amount of report information can be reduced compared with the case where information concerning all of the selected channels is reported, and overhead caused by feedback can be reduced.

[Fourth Embodiment]

In the first to third embodiments, the case where the channel number of a delete channel is reported when the delete channel is reported from the terminal device to the base station device has been explained.

In a fourth embodiment, not the channel number of a delete channel, but buffer number information corresponding to the delete channel is reported from the terminal device to the base station device when the delete channel is reported from the terminal device to the base station device. The buffer number information (the identification number of a buffer region) concerning a buffer included in the base station and storing information concerning request channels is preliminarily indicated from the base station to the terminal device. Since the buffer number information may be unique only in the buffer, the amount of information can be reduced compared with the case of the channel number which is unique among all channels, and therefore the amount of feedback information can be further reduced.

Figure 14:
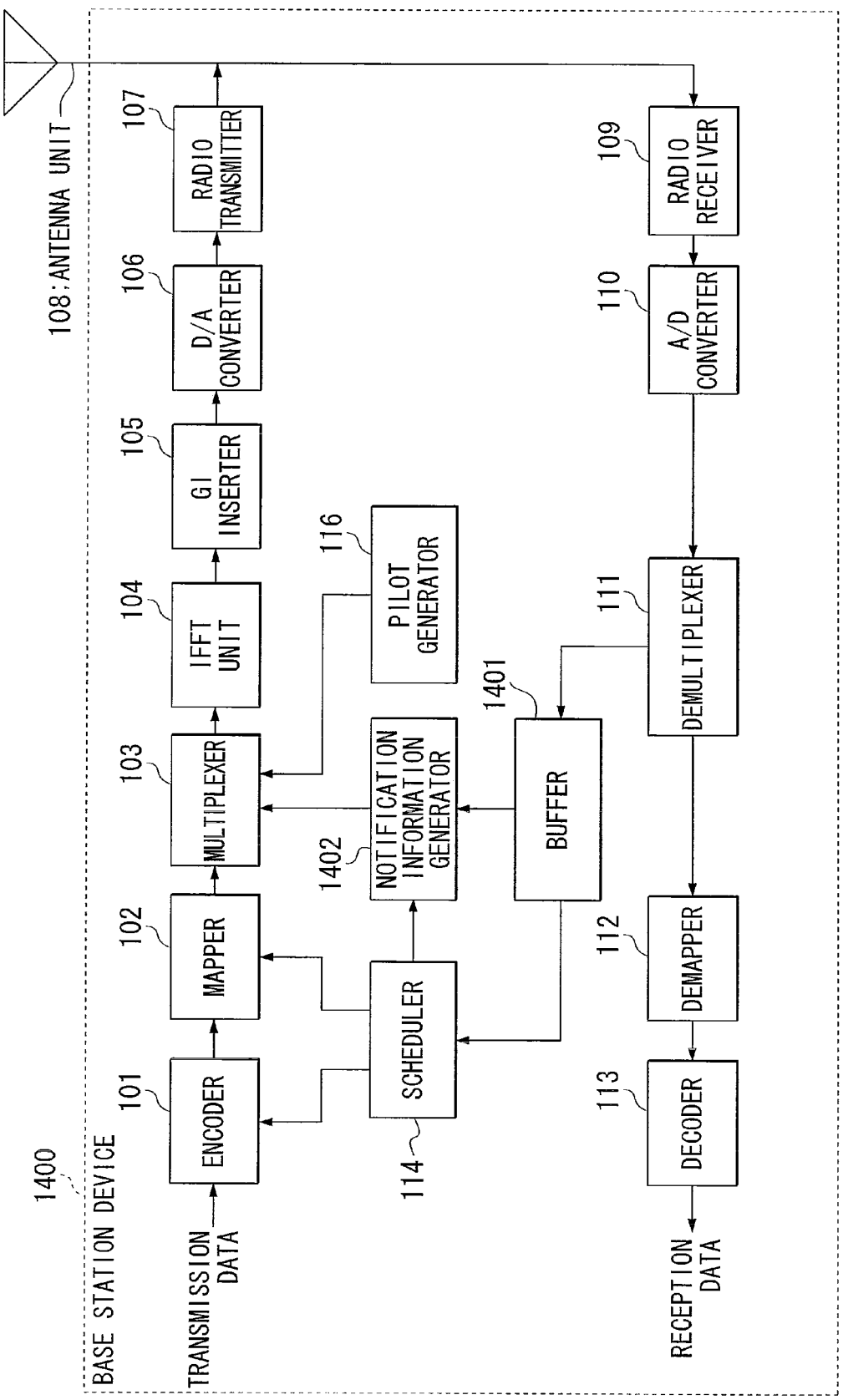
FIG. 14 is a block diagram illustrating the configuration of a base station device 1400 according to a fourth embodiment of the present invention.
Figure 15:
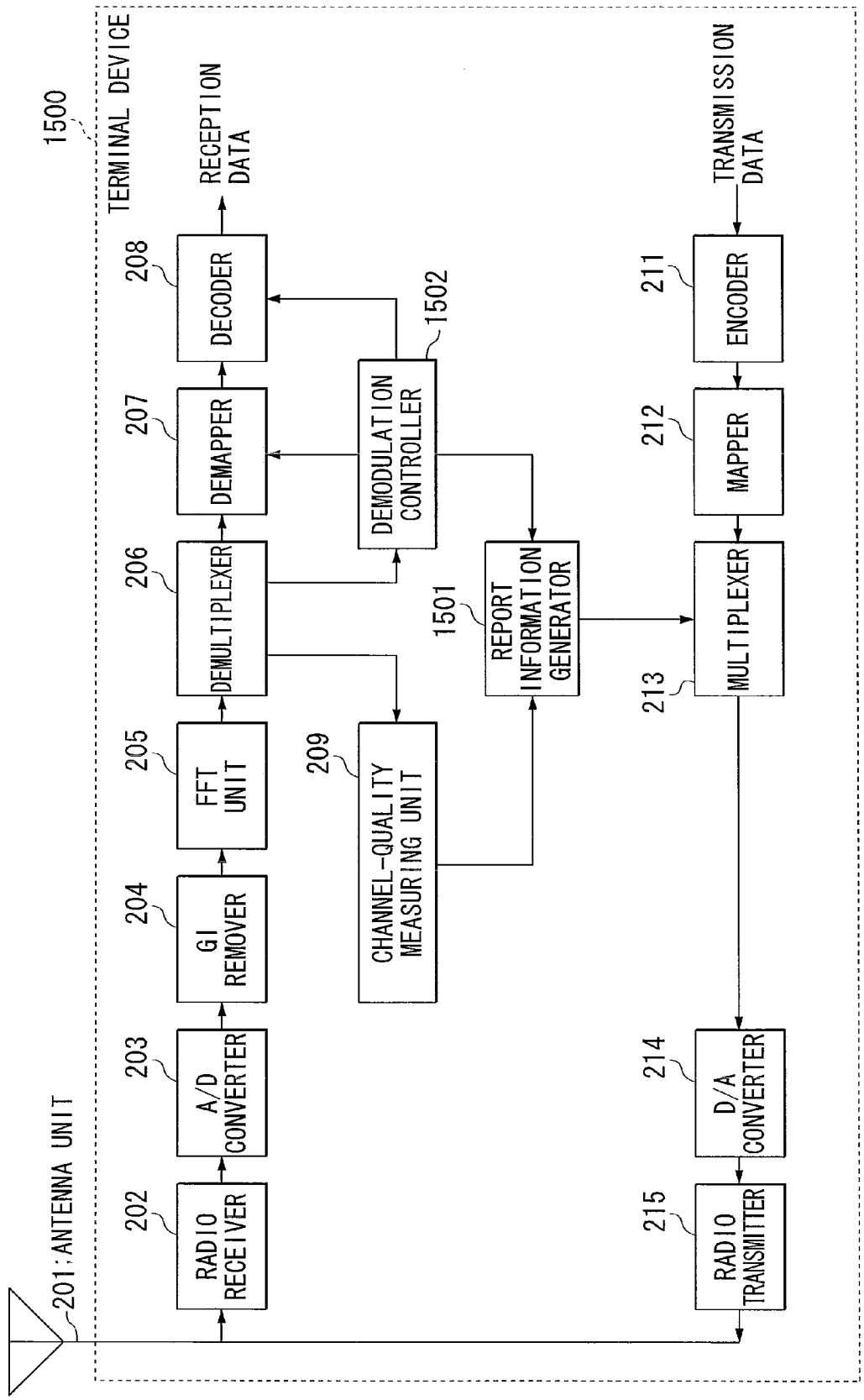
FIG. 15 is a block diagram illustrating the configuration of a terminal device 1500 according to the fourth embodiment.

FIG. 14 is a schematic block diagram illustrating the configuration of a base station device 1400 according to the fourth embodiment. FIG. 15 is a schematic block diagram illustrating the configuration of a base station 1500 according to the fourth embodiment. Like reference numerals shown in FIGS. 14 and 15 represent like units of the first embodiment (FIGS. 1 and 2), and explanations thereof are omitted.

The base station device 1400 includes the encoder 101, the mapper 102, the multiplexer 103, the IFFT unit 104, the GI inserter 105, the D/A converter 106, the radio transmitter 107, the antenna unit 108, the radio receiver 109, the A/D converter 110, the demultiplexer 111, the demapper 112, the decoder 113, the scheduler 114, a notification information generator 1402, the pilot generator 116, and a buffer (request-channel rearranging unit) 1401.

The terminal device 1500 includes the antenna unit 201, the radio receiver 202, the A/D converter 203, the GI remover 204, the FFT unit 205, the demultiplexer 206, the demapper 207, the decoder 208, the channel-quality measuring unit 209, a report information generator 1501, the encoder 211, the mapper 212, the multiplexer 213, the D/A converter 214, the radio transmitter 215, and a demodulation controller 1502.

Hereinafter, the buffer 1401, the notification information generator 1402, the report information generator 1501, and the demodulation controller 1502 which are blocks that perform processing different from that of the first embodiment are mainly explained. Processing performed by the other units are the same as that of the first embodiment.

The notification information generator 1402 included in the base station 1400 shown in FIG. 14 receives scheduling information and modulation parameter information from the scheduler 114, and buffer number information concerning buffers each storing request channel information and corresponding channel quality information from the buffer 1401. The notification information generator 1402 generates a notification-information symbol string for indicating the scheduling information, the modulation parameter information, and the buffer number information corresponding to the respective request channels to the base station device 1500.

The demodulation controller 1502 included in the terminal device 1500 shown in FIG. 15 generates scheduling information, modulation parameter information, and buffer number information concerning each of the previously-selected request channels. Then, the demodulation controller 1502 outputs the scheduling information and the modulation parameter information to the demapper 207 and the decoder 208, and the buffer number information concerning each of the previously-selected request channels to the report information generator 1501.

In the fourth embodiment, a block that is a combination of the demultiplexer 206 and the demodulation controller 1502 functions as a buffer identification demultiplexer.

Figures 16, 17, 18:
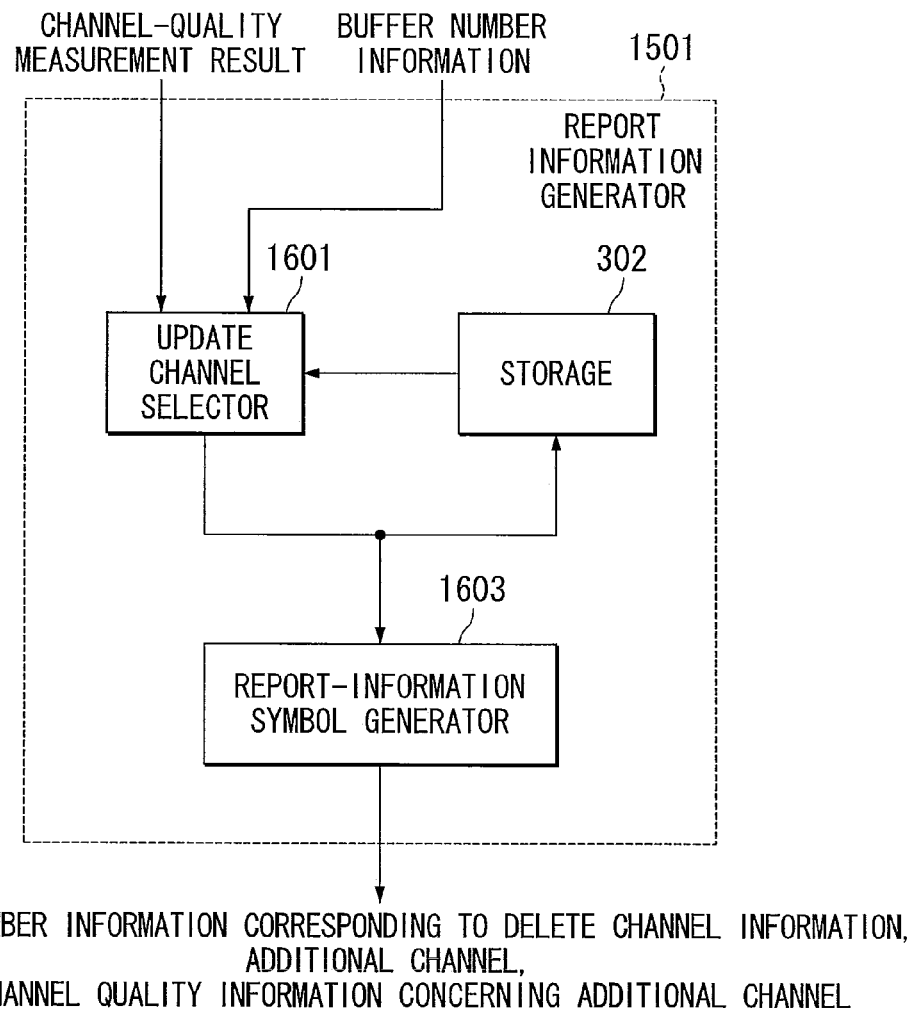
FIG. 16 is a block diagram illustrating the inner configuration of a report information generator 1501 according to the fourth embodiment.
FIG. 17 illustrates an example of buffer number information output by a demodulation controller 1502 according to the fourth embodiment.
FIG. 18 illustrates an example of report information according to the fourth embodiment.

FIG. 16 is a schematic block diagram illustrating the inner configuration of the report information generator 1501.

The storage 302 is a block having the same function as that of the storage 302 of the first embodiment, and stores multiple request channels and channel quality information concerning the request channels at the time of the last update. The update channel selector 1601 performs similar processing to that of the first embodiment based on the channel-quality measurement results received from the channel-quality measuring unit 209, and the request channels and the channel quality information concerning the request channels at the time of the last update which are received from the storage 302, and selects a delete channel and an additional channel. Then, the update channel selector 1601 outputs delete channel information, the additional channel information, and channel quality information concerning the additional channel to the storage 302. At the same time, the update channel selector 1601 outputs buffer number information corresponding to the delete channel, the additional channel information, and channel quality information concerning the additional channel to the report-information symbol generator 1603. At this time, a value that the update channel selector 1601 received from the demodulation controller 1502 is used for the buffer number information concerning each of the previously-selected request channels. The report-information symbol generator 1603 generates a report-information symbol string for reporting, to the base station 1400, the buffer number information corresponding to the delete channel received from the update channel selector 1601, the additional channel information, and the channel quality information concerning the additional channel.

The report-information symbol string received from the terminal device 1500 is demultiplexed from the reception signal received by the demultiplexer 111 included in the base station 1400 and output to the buffer 1401. Based on the buffer number information corresponding to the delete channel, the additional channel information, and the channel quality information concerning the additional channel which have been reported from the terminal device 1500, the buffer 1401 updates request channel information and channel quality information which are stored in the buffer, and outputs the updated information to the scheduler 114. Additionally, the buffer 1401 outputs the buffer number information in which a combination of the channel number corresponding to each request channel and the channel quality thereof is stored to the report information generator 1402.

Hereinafter, operations performed by the report information generator 1501 are explained with examples where buffer number information (combinations of the channel numbers and the buffer numbers "C1 and B3", "C2 and B1", and "C3 and B2") as shown in FIG. 17 is output from the demodulation controller 1502 to the update channel selector 1601.

Similar to the first embodiment, it is assumed that information shown in FIG. 4 as an example of the channel-quality measurement results indicated from the channel-quality measuring unit 209 (combinations of the channel numbers and channel-quality measurement results "C1 and 6", "C2 and 9", "C3 and 10", "C4 and 6", "C5 and 3", and "C6 and 8") and information shown in FIG. 5 as an example of the information concerning multiple request channels and the channel qualities thereof (combinations of the channel numbers and channel quality information "C1 and 7", "C2 and 9", and "C3 and 10") have been output to the update channel selector 1601.

The basic operations performed by the update channel selector 1601 are similar to those shown in FIG. 6, and the specific calculation thereof is also similar to that of the first embodiment. Therefore, the update channel selector 1601 selects channels C1 and C6 as the delete channel and the additional channel, respectively. The update channel selector 1601 selects the buffer number B3 corresponding to the delete channel C1 with reference to the buffer number information shown in FIG. 17. Then, the update channel selector 1601 outputs information indicative of the delete channel "C1", information indicative of the additional channel "C6", and information indicative of the channel quality of the additional channel "8" to the storage 302. At the same time, the update channel selector 1601 outputs information indicative of the buffer number "B3", information indicative of the additional channel "C6", and information indicative of the channel quality of the additional channel "8" to the report information generator 1603. In other words, the report information is information as shown in FIG. 18 (the buffer number of the delete channel "B3", the additional channel number "C6", and the channel quality of the additional channel "8").

Although it has been explained in the fourth embodiment that the buffer 1401 of the base station 1400 stores information concerning the previously-selected request channels and the channel qualities thereof, what the buffer stores is not limited to the information concerning the request channels and the channel qualities thereof for one update. The buffer 1401 may store information concerning request channels and the channel qualities thereof for multiple updates. Alternatively, only the information concerning the request channels for multiple updates may be stored therein so that the scheduler 114 performs scheduling based on the stored information.

As explained above, according to the fourth embodiment, the terminal device 1500 can report only the buffer number information corresponding to the delete channel and the additional channel information as channel information upon selecting some channels from all channels and reporting the channel quality information concerning the selected channels to the base station 1400. Therefore, the amount of report information can be reduced compared with the case where information concerning all of the selected channels is reported, and overhead caused by feedback can be reduced. Further, only channel quality information concerning the additional channel can be reported upon channel quality information concerning the selected channels being reported. Therefore, the amount of report information can be reduced compared with the case where information concerning all of the selected channels is reported, and overhead caused by feedback can be reduced.

Although the buffer number information is used as information for specifying a delete channel, another identification information uniquely defined among request channels, such as what channel number counted from the smallest channel number corresponds to the delete channel, may be used in lieu of the buffer number information. In the fourth embodiment, the notification information generator 1402 generates a notification-information symbol string for indicating buffer number information corresponding to each request channel obtained from the buffer 1401, and indicates the generated string to the terminal device 1500. However, identification information corresponding to each request channel (buffer number information of the fourth embodiment) may not be indicated from the base station 1400 to the terminal device 1500 if the identification information is generated based on a given rule, such as what channel number counted from the smallest channel number corresponds to the delete channel, which has been explained above.

[Fifth Embodiment]

Similar to the second embodiment with respect to the first embodiment, a storage may not be included in a report information generator included in the terminal device in the fifth embodiment.

Figure 19:
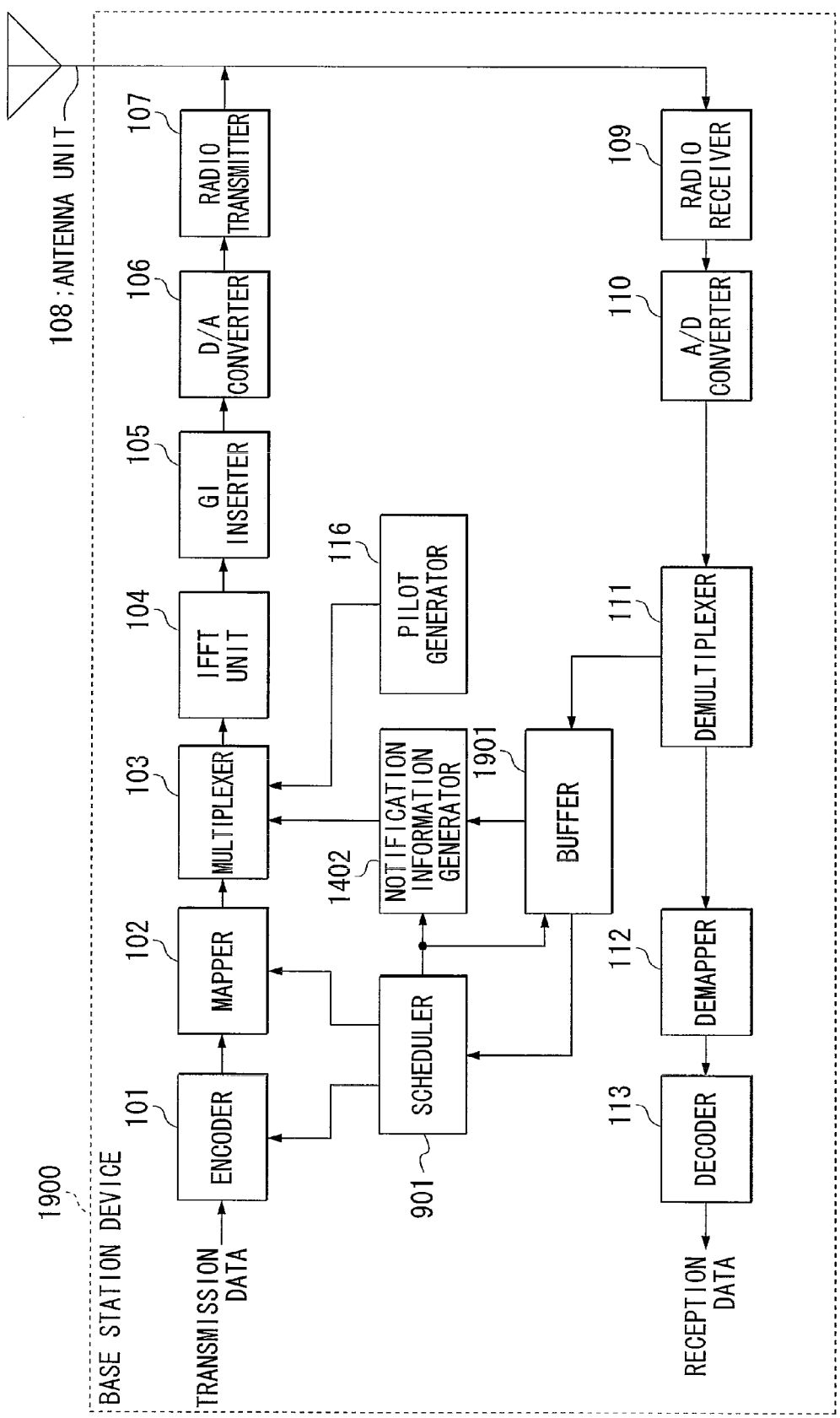
FIG. 19 is a block diagram illustrating the configuration of a base station device 1900 according to a fifth embodiment of the present invention.
Figure 20:
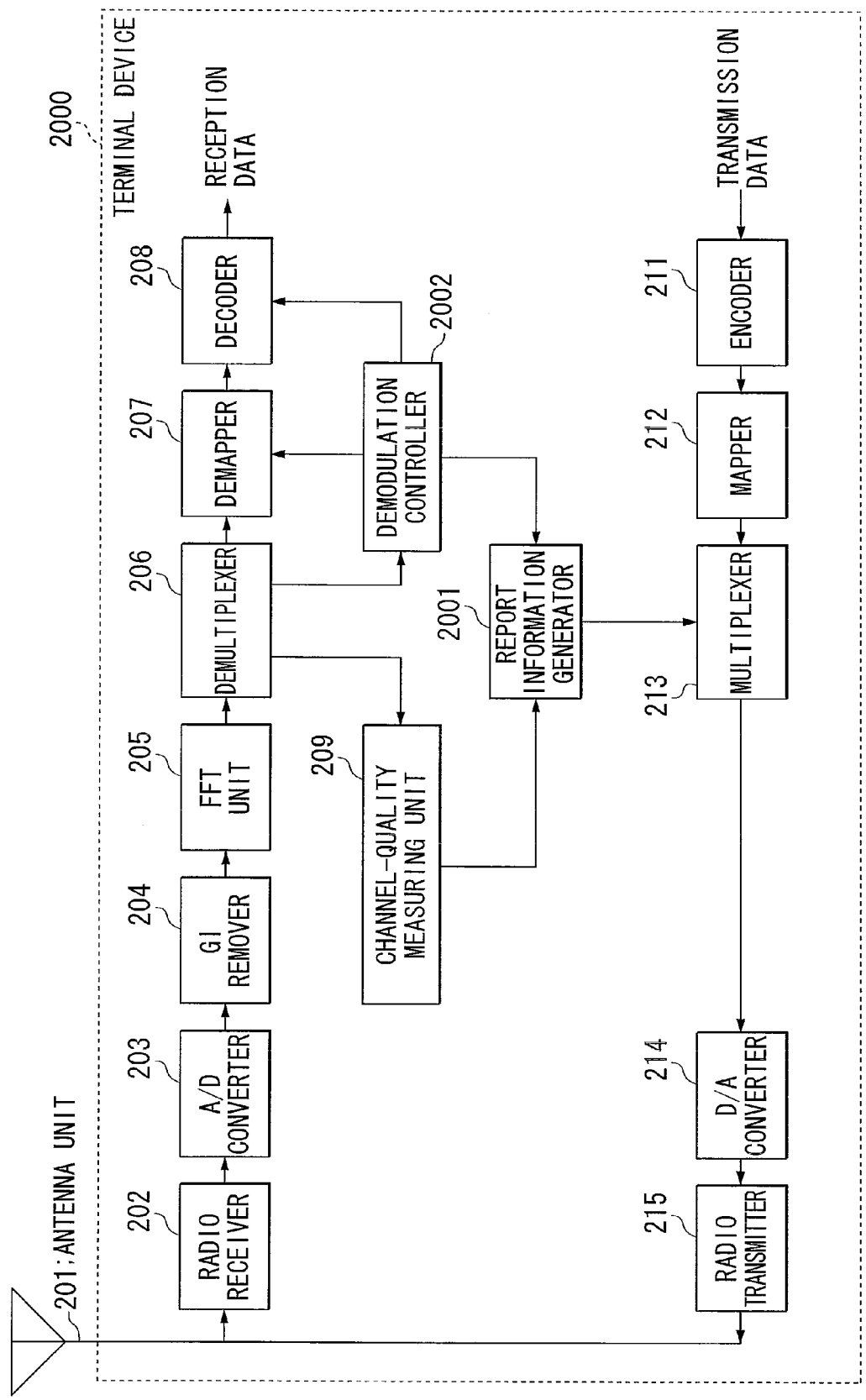
FIG. 20 is a block diagram illustrating the configuration of a terminal device 2000 according to the fifth embodiment.

FIG. 19 is a schematic block diagram illustrating the configuration of a base station 1900 according to the fifth embodiment. FIG. 20 is a schematic block diagram illustrating the configuration of a terminal device 2000 according to the fifth embodiment.

Like reference numerals shown in FIGS. 19 and 20 represent like units of the first embodiment (FIGS. 1 and 2), the second embodiment (FIGS. 9 and 10), and the fourth embodiment (FIGS. 14 and 15), and explanations thereof are omitted. In the fifth embodiment, modulation parameters are reported as channel qualities from the terminal device 2000 to the base station device 1900.

The scheduler 901 included in the base station device 1900 outputs scheduling information and modulation parameter information not only to the encoder 101, the mapper 102, and the notification information generator 1402, but also to a buffer (request-channel rearranging unit) 1901. The buffer 1901 stores multiple used channels and channel quality information concerning the used channels (modulation parameters) at the time of the last update. When the scheduling information and the modulation parameter information are received from the scheduler 901, the buffer 1901 updates the stored used channels and the stored channel quality information concerning the used channels. After the update, the buffer 1901 indicates, to the notification information generator 1402, buffer number information (identification information concerning buffer regions) concerning buffers storing information concerning used channels which have been scheduled and channel qualities thereof.

Based on the notification-information symbol string received from the demultiplexer 206, a demodulation controller 2002 included in the terminal device 2000 generates scheduling information and modulation parameter information, and outputs the generated information not only to the demapper 207 and the decoder 208, but also to the report information generator 2001. At the same time, the demodulation controller 2002 also generates buffer number information and outputs the generated buffer number information to the report information generator 2001.

In the fifth embodiment, a block that is a combination of the demultiplexer 206 and the demodulation controller 2002 functions as a buffer identification demultiplexer.

The report information generator 2001 generates a report-information symbol string based on the channel-quality measurement results (modulation parameters) for respective channels received from the channel-quality measuring unit 209, the scheduling information (information concerning channels allocated to transmission data addressed to the terminal device 2000) received from the demodulation controller 2002, and the modulation parameters, and outputs the generated string to the multiplexer 213.

Figure 21:
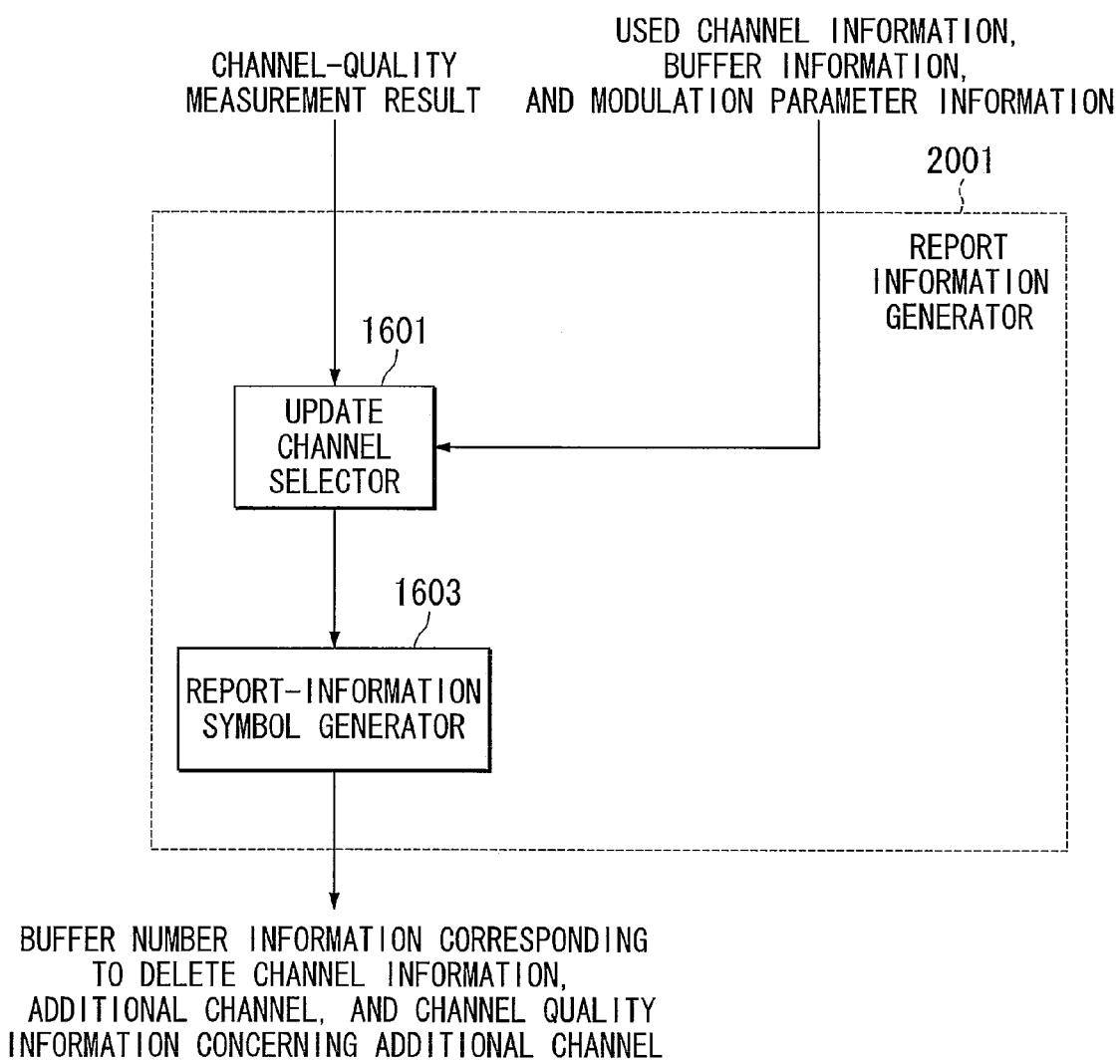
FIG. 21 is a block diagram illustrating the inner configuration of a report information generator 2001 according to the fifth embodiment.

FIG. 21 illustrates the inner block configuration of the report information generator 2001. Basic operations performed by the update channel selector 1601 are similar to those shown in the flowchart in FIG. 12. Only an input source is different from the fourth embodiment, and the update channel selector 1601 of the fifth embodiment performs processing similar to that performed by the update channel selector 1601 of the fourth embodiment. In the fourth embodiment, request channel information and channel quality information concerning the request channels which are stored in the storage 302, channel-quality measurement results, and buffer number information are input. In the fifth embodiment, used channel information (channel allocated to transmission data addressed to the terminal device 2000), channel quality information concerning used channels (modulation parameters), channel-quality measurement results (modulation parameters), and buffer number information are input.

Upon receiving the report information (buffer number information corresponding to the delete channel, additional channel information, and channel quality information concerning the additional channel) from the terminal device 2000, the buffer 1901 included in the base station device 1900 outputs, to the scheduler 901, information obtained by updating the used channel information and the modulation parameters corresponding to the used channels at the time of the last scheduling based on the report information. At this time, the information stored in the buffer 1901 is not updated.

As explained above, according to the fifth embodiment, the terminal device 2000 can report only the buffer number information corresponding to the delete channel and the additional channel information as channel information upon selecting some channels from all channels and reporting the channel qualities of the selected channels to the base station 1900. Therefore, the amount of report information can be reduced compared with the case where information concerning all of the selected channels is reported, and overhead caused by feedback can be reduced. Further, only channel quality information concerning the additional channel is reported upon channel quality information concerning the selected channels being reported. Therefore, the amount of report information can be reduced compared with the case where information concerning all of the selected channels is reported, and overhead caused by feedback can be reduced.

[Sixth Embodiment]

It has been explained in the fifth embodiment that the channel number of a delete channel is not reported when the delete channel is reported from the terminal device to the base station device, but that buffer number information concerning buffers included in the base station device and storing information concerning used channels is preliminarily indicated from the terminal device to the base station device, and buffer number information corresponding to a delete channel is reported from the terminal device to the base station device. However, not the buffer information, but the serial numbers assigned to the used channels may be used as information for identifying delete channels.

If the used channels (C1, C2, and C3) shown in FIG. 17 are allocated, for example, an arrangement in which the serial numbers (A1, A2, and A3) are assigned to the used channels in descending order of frequency is preliminarily made between the base station and the terminal device. Thereby, information indicative of A1 in lieu of B3 shown in FIG. 18 may be reported.

Thus, the method of assigning the serial numbers to used channels is preliminarily determined between the base station and the terminal device. Thereby, the amount of report information can be reduced to a degree similar to that of the fifth embodiment without the buffer information being reported.

Although the case where the serial numbers are assigned in a descending order of frequency as a method of assigning the serial numbers has been explained in the sixth embodiment, the method is not limited thereto, as a matter of course, as long as a method of assigning the serial numbers to used channels is preliminarily determined between the base station and the terminal device so that information concerning request channels is shared therebetween.

In other words, another identification information uniquely defined among used channels, such as what channel number counted from the smallest channel number corresponds to a target channel, may be used in lieu of the buffer number information. Additionally, identification information corresponding to each request channel may not be indicated from the base station to the terminal device if identification information generated based on a given rule, such as what channel number counted from the smallest used channel number corresponds to a target channel, is used.

Although the sixth embodiment has been explained as a modification of the fifth embodiment, the sixth embodiment can be modified from each of the other embodiments.

[Seventh Embodiment]

The case where information concerning a delete channel, an additional channel, and the channel quality of the additional channel is reported from the terminal device to the base station device has been explained in each of the embodiments.

The present invention is applicable to a system in which some channels are selected from all channels, the channel qualities of the selected channels are averaged, and information indicative of the selected channels and the average channel quality is reported from the terminal device to the base station device.

Figure 22:
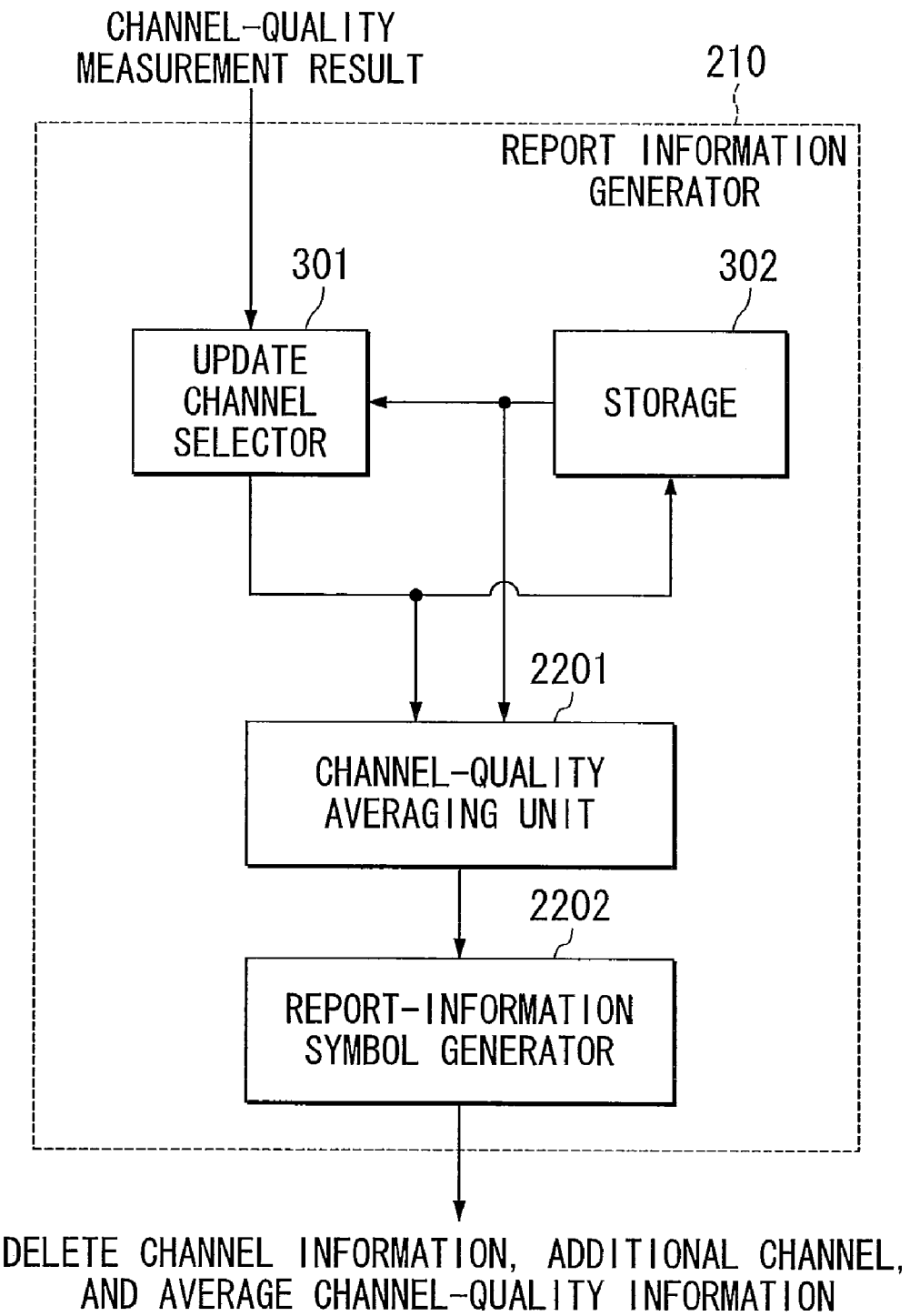
FIG. 22 is a block diagram illustrating the inner configuration of the report information generator 210 according to a seventh embodiment of the present invention.

Hereinafter, the case where the present invention is applied to a system having the block configurations similar to the base station 100 and the terminal device 200 of the first embodiment is explained. FIG. 22 is a schematic block diagram illustrating the inner configuration of the report information generator 210 included in the terminal device 200 which is modified based on the seventh embodiment.

The processing performed by the update channel selector 301 and the storage 302 is similar to that of the update channel selector 301 and the storage 302 of the first embodiment. Request channel information and channel quality information concerning the request channels at the time of the last update which are output from the storage 302, and information concerning a delete channel, an additional channel, and the channel quality of the additional channel which is output from the update channel selector 301, are input to the channel-quality averaging unit 2201. The channel-quality averaging unit 2201 updates the request channels and the corresponding channel quality information at the time of the last update based on the information concerning the delete channel, the additional channel, and the channel quality of the additional channel. Then, the channel-quality averaging unit 2201 averages the channel qualities of the updated request channels, and outputs the delete channel information, the additional channel information, and average channel-quality information. The delete channel information, the additional channel information, and the average channel quality information are output from the channel-quality averaging unit 2201 to the report-information symbol generator 2202. Then, the report-information symbol generator 2202 generates a report-information symbol string for reporting these information items to the base station.

In the seventh embodiment, a block that is a combination of the update channel selector 301 and the channel-quality averaging unit 2201 functions as an update channel selector.

Hereinafter, an example of operations performed by the report information generator 210 according to the seventh embodiment is explained.

Similar to the first embodiment, it is assumed that the information shown in FIG. 4 as an example of the channel-quality measurement results indicated from the channel-quality measuring unit 209 ("C1 and 6", "C2 and 9", "C3 and 10", "C4 and 6", "C5 and 3", and "C6 and 8" which are combinations of the channel numbers and the channel-quality measurements results) and the information shown in FIG. 5 as an example of information concerning multiple request channels and channel qualities thereof which is stored in the storage 302 ("C1 and 7", "C2 and 9", and "C3 and 10" which are combinations of the channel numbers and the channel quality information) are output to the update channel selector 301. The basic operations performed by the update channel selector 301 are similar to those shown in the flowchart in FIG. 6, and the specific calculation thereof is also similar to that of the first embodiment. Therefore, channels C1 and C6 shown in FIG. 7 are respectively selected as a delete channel and an additional channel.

The channel-quality averaging unit 2201 updates the information concerning the request channels and the channel qualities thereof at the time of the last update which is shown in FIG. 5 based on the information concerning the delete channel, the additional channel, and the channel quality of the additional channel which is received from the update channel selector 301 and shown in FIG. 7. The updated information is the information shown in FIG. 8 ("C2 and 9", "C3 and 10", and "C6 and 8" which are combinations of the channel numbers and channel quality information). Then, the channel-quality averaging unit 2201 averages the channel qualities (9, 10, and 8) of the request channels (C2, C3, and C6 in this case) and obtains an average value (9 in this case). Then, the channel-quality averaging unit 2201 outputs the delete channel information (C1 in this case), the additional channel information (C6 in this case), and the average channel-quality information (9 in this case) which are shown in FIG. 23.

Although the case where the processing performed by the report information generator 210 of the first embodiment is applied to the system in which some channels are selected from all channels, the channel qualities of the selected channels are averaged, and then the information concerning the selected channels and the average channel quality is reported from the terminal device to the base station device has been explained in the seventh embodiment, the present invention is not limited thereto. As a matter of course, the processing performed by the report information generator of each of the embodiments can be applied.

Although the case where an average channel quality of multiple request channels is reported has been explained in the seventh embodiment, the present invention is not limited thereto. Similar to the seventh embodiment, the present invention is applicable to a system for reporting an indicator calculated from channel qualities of multiple request channels, such as a system for reporting a weighted average of the channel qualities of multiple request channels or a system for reporting the minimum value of the channel qualities of multiple request channels.

As explained above, according to the seventh embodiment, the terminal device can report only the buffer number information corresponding to the delete channel and the additional channel information as channel information upon selecting some channels from all channels and reporting the channel qualities of the selected channels to the base station. Therefore, the amount of report information can be reduced compared with the case where information concerning all of the selected channels is reported, and overhead caused by feedback can be reduced.

[Eighth Embodiment]

The case where information concerning the delete channel, the additional channel, and the channel quality of the additional channel is reported from the terminal device to the base station device has been explained in each of the embodiments (the first to sixth embodiments excluding the seventh embodiment).

In the eighth embodiment, the case where information concerning the delete channel, the additional channel, and the channel quality of each request channel is reported is explained.

Similar to the first embodiment, the case where information shown in FIG. 4 as an example of the channel-quality measurement results indicated from the channel-quality measuring unit 209, and information shown in FIG. 5 as an example of information concerning multiple request channels and channel qualities thereof which is stored in the storage 302 are output to the update channel selector 1601 is explained. The basic operations performed by the update channel selector 301 are also similar to those shown in FIG. 6.

Since the specific calculation performed by the update channel selector 301 is also similar to that of the first embodiment, channels C1 and C6 are respectively selected as a delete channel and an additional channel. In other words, the update channel selector 301 determines request channels (C2, C3, and C6 in this case) and the channel qualities thereof (9, 10, and 8). Then, the update channel selector 301 outputs the request channels and the channel qualities thereof to the storage 302, and information indicative of the delete channel C1, the additional channel C6, the request channels, and the channel qualities of the request channels 9, 10, and 8 to the report-information symbol generator 1603. In other words, the report information is one as shown in FIG. 24. The report-information symbol generator 303 generates a report-information symbol string for reporting the report information (delete channel information, additional channel information, and channel quality information concerning request channels) to the base station device 100.

If the report-information symbol generator 1603 sorts the channel quality information based on a given rule, such as in descending order of frequency, at this time, the base station device 100 can determine a correlation between each value of the channel quality information and the corresponding channel based on the rule.

Although the eighth embodiment has been explained as a modification of the first embodiment, similar modifications of the other embodiments (second to fifth embodiments) are possible.

As explained above, according to the eighth embodiment, the terminal device can report only the buffer number information corresponding to the delete channel and the additional channel information as channel information upon selecting some channels from all channels and reporting the channel qualities of the selected channels to the base station. Therefore, the amount of report information can be reduced compared with the case where information concerning all of the selected channels is reported, and overhead caused by feedback can be reduced.

The following units may be implemented by dedicated hardware, a memory, a microprocessor, or a program making the microprocessor function.

The encoder 101, the mapper 102, the multiplexer 103, the IFFT unit 104, the GI inserter 105, the demultiplexer 111, the demapper 112, the decoder 113, the scheduler 114, the notification information generator 115, the pilot generator 116, and the buffer 117, which are shown in FIG. 1

The GI remover 204, the FFT unit 205, the demultiplexer 206, the demapper 207, the decoder 208, the channel-quality measuring unit 209, the report information generator 210, the encoder 211, the mapper 212, the multiplexer 213, and the demodulation controller 216, which are shown in FIG. 2

The update channel selector 301, the storage 302, and the report-information symbol generator 303, which are shown in FIG. 3

The encoder 101, the mapper 102, the multiplexer 103, the IFFT unit 104, the GI inserter 105, the demultiplexer 111, the demapper 112, the decoder 113, the scheduler 901, the notification generator 115, the pilot generator 116, and the buffer 902, which are shown in FIG. 9

The GI remover 204, the FFT unit 205, the demultiplexer 206, the demapper 207, the decoder 208, the channel-quality measuring unit 209, the report information generator 1001, the encoder 211, the mapper 212, the multiplexer 213, the demodulation controller 1002, which are shown in FIG. 10

The update channel selector 301 and the report-information symbol generator 303, which are shown in FIG. 11

The encoder 101, the mapper 102, the multiplexer 103, the IFFT unit 104, the GI inserter 105, the demultiplexer 111, the demapper 112, the decoder 113, the scheduler 114, the notification information generator 1402, the pilot generator 116, and the buffer 1401, which are shown in FIG. 14

The GI remover 204, the FFT unit 205, the demultiplexer 206, the demapper 207, the decoder 208, the channel-quality measuring unit 209, the report information generator 1501, the encoder 211, the mapper 212, the multiplexer 213, and the demodulation controller 1502, which are shown in FIG. 15

The update channel selector 1601, the storage 302, and the report-information symbol generator 1603, which are shown in FIG. 16

The encoder 101, the mapper 102, the multiplexer 103, the IFFT unit 104, the GI inserter 105, the demultiplexer 111, the demapper 112, the decoder 113, the scheduler 901, the notification information generator 1402, the pilot generator 116, and the buffer 1901, which are shown in FIG. 19

The GI remover 204, the FFT unit 205, the demultiplexer 206, the demapper 207, the decoder 208, the channel-quality measuring unit 209, the report information generator 2001, the encoder 211, the mapper 212, the multiplexer 213, and the demodulation controller 2002, which are shown in FIG. 20

The update channel selector 1601 and the report-information symbol generator 1603, which are shown in FIG. 21

Although the embodiments of the present invention have been explained in detail with reference to the accompanying drawings, the specific configuration is not limited thereto, and various modifications can be made without departing from the scope of the present invention.

INDUSTRIAL APPLICABILITY

The present invention is preferably used for, but not limited to, a cellular phone system for communication over channels allocated from multiple channels by a transmitter, such as OFDMA.

The invention claimed is:

1. A first wireless communication device that receives a signal from a second wireless communication device via a channel, from a plurality of available channels, allocated to the first wireless communication device by the second wireless communication device, the first wireless communication device comprising:

an update channel selector that selects a group of request channels that are candidates to be allocated to the first wireless communication device from the available channels, calculates a difference between the group of selected request channels and a group of predetermined channels, and generates difference information indicative of at least deleted channels and additional channels; and a multiplexer that multiplexes the difference information to a second signal to be transmitted to the second wireless communication device.

2. The first wireless communication device according to claim 1, wherein the group of predetermined channels is a group of request channels previously selected.

3. The first wireless communication device according to claim 1, wherein the group of predetermined channels is a group of channels allocated by the second wireless communication device.

4. The first wireless communication device according to claim 1, wherein
the difference information further comprises
an identifier uniquely defined among the predetermined channels to be compared with the selected request channels when the difference is calculated to determine the channel to be deleted.

5. The first wireless communication device according to claim 1, further comprising
a buffer identification demultiplexer that demultiplexes, from the signal received from the second wireless communication device, identifiers of buffer regions into which the second wireless communication device stores identifiers of the selected request channels, respectively, wherein
the update channel selector uses corresponding one of the identifiers demultiplexed by the buffer identification demultiplexer as information concerning a channel to be deleted which is included in the difference information.

6. The first wireless communication device according to claim 3, further comprising
a buffer identification demultiplexer that demultiplexes, from the signal received from the second wireless communication device, identifiers of buffer regions into which the second wireless communication device stores the channels allocated by the second wireless communication device, respectively, wherein
the update channel selector uses corresponding one of the identifiers demultiplexed by the buffer identification demultiplexer as information concerning a channel to be deleted which is included in the difference information.

7. The first wireless communication device according to claim 1, further comprising
a channel-quality measuring unit that measures channel qualities of the channels, wherein
the update channel selector selects the request channels based on a result of a measurement performed by the channel-quality measuring unit.

8. The first wireless communication device according to claim 7, wherein:
the update channel selector extracts, from the channel qualities measured by the channel-quality measuring unit, a channel quality of an added channel included in the difference; and
the multiplexer multiplexes the difference information and information indicative of the channel quality extracted by the update channel selector to the signal to be transmitted.

9. The first wireless communication device according to claim 7, wherein
the update channel selector extracts channel qualities of the selected request channels from the channel qualities measured by the channel-quality measuring unit, and
the multiplexer multiplexes the difference information and information indicative of the extracted channel qualities and an average value of the extracted channel qualities to the signal to be transmitted.

10. A wireless communication device that transmits a signal to a second wireless communication device using a channel allocated to the second wireless communication device from a plurality of channels, the wireless communication device comprising:
a demultiplexer that demultiplexes, from a reception signal received from the second wireless communication device, difference information indicative of a difference between a group of request channels that are candidates to be allocated to the second wireless communication device and a group of previously requested channels, the difference information indicative of at least deleted channels and additional channels;
an update channel selector that selects a group of request channels that are candidates to be allocated to the first wireless communication device from the available channels, calculates a difference between the group of selected request channels and a group of predetermined channels, and generates difference information indicative of at least deleted channels and additional channels;
a request-channel rearranging unit that rearranges the group of the request channels based on the difference information; and
a scheduler that selects a channel to be allocated to the second wireless communication device based on the group of the request channels rearranged by the request-channel rearranging unit.

11. The wireless communication device according to claim 10, wherein
the request-channel rearranging unit stores identifiers of the request channels included in the rearranged group into buffer regions, respectively, and uses the identifiers of the request channels respectively stored in the buffer regions at a last rearrangement when the group of the request channels is rearranged, and the wireless communication device further comprises
a multiplexer that multiplexes identifiers of the buffer regions respectively storing the identifiers of the request channels to the signal to be transmitted to the second wireless communication device.

12. A wireless communication device that transmits a signal to a second wireless communication device using a channel allocated to the second wireless communication device from a plurality of channels, the wireless communication device comprising:
a demultiplexer that demultiplexes, from a reception signal received from the second wireless communication device, difference information indicative of a difference between a group of request channels that are candidates to be allocated to the second wireless communication device and a group of channels previously allocated to the second wireless communication device, the difference information indicative of at least deleted channels and additional channels;
a request-channel rearranging unit that rearranges the group of the request channels based on the difference information; and a scheduler that selects a channel to be allocated to the second wireless communication device based on the group of the request channels rearranged by the request-channel rearranging unit.

13. The wireless communication device according to claim 12, wherein the request-channel rearranging unit stores identifiers of channels allocated to the second wireless communication device into buffer regions, respectively, and uses the identifiers of the channels respectively stored in the buffer regions when the group of the request channels are rearranged, and the wireless communication device further comprises a multiplexer that multiplexes identifiers of the buffer regions respectively storing the identifiers of the channels to the signal to be transmitted.

14. A wireless communication system comprising a first wireless communication device and a second wireless communication device that receives a signal using a channel allocated by the first wireless communication device, the second wireless communication device comprising:

an update channel selector that selects a plurality of request channels that are candidates to be allocated to the second wireless communication device from the channels, calculates a difference between a group of the request channels and a group of previously-selected channels, and generates difference information indicative of at least deleted channels and additional channels; and a multiplexer that multiplexes the difference information to a signal to be transmitted to the first wireless communication device, and the first wireless communication device comprising:

a demultiplexer that demultiplexes the difference information from the signal received from the second wireless communication device;

a request-channel rearranging unit that rearranges the group of the request channels based on the difference information demultiplexed by the demultiplexer; and a scheduler that selects a channel to be allocated to the second wireless communication device based on the group of the request channels rearranged by the request-channel rearranging unit.

15. A wireless communication system comprising a first wireless communication device and a second wireless communication device that receives a signal using a channel allocated by the first wireless communication device, the second wireless communication device comprising:

an update channel selector that selects a plurality of request channels that are candidates to be allocated to the second wireless communication device from the channels, calculates a difference between a group of the request channels and a group of channels allocated by the first wireless communication device, and generates difference information indicative of at least deleted channels and additional channels; and a multiplexer that multiplexes the difference information to a signal to be transmitted to the first wireless communication device, and the first wireless communication device comprising:

a demultiplexer that demultiplexes the difference information from the signal received from the second wireless communication device;

a request-channel rearranging unit that rearranges the group of the request channels based on the difference information demultiplexed by the demultiplexer; and a scheduler that selects a channel to be allocated to the second wireless communication device based on the group of the request channels rearranged by the request-channel rearranging unit.

\* \* \* \* \*